US012735260B2

(12) United States Patent
Fu et al.

(10) Patent No.: US 12,735,260 B2
(45) Date of Patent: Sep. 15, 2026

(54) WAREHOUSING SYSTEM CONTROL METHOD AND APPARATUS, AND DEVICE AND COMPUTER-READABLE STORAGE MEDIUM

(71) Applicant: SHANGHAI QUICKTRON INTELLIGENT TECHNOLOGY CO., LTD, Shanghai (CN)

(72) Inventors: Liangliang Fu, Shanghai (CN); Ende Huang, Shanghai (CN); Wei Yang, Shanghai (CN)

(73) Assignee: SHANGHAI QUICKTRON INTELLIGENT TECHNOLOGY CO., LTD, Shanghai (CN)

( * ) Notice: Subject to any disclaimer, the term of this patent is extended or adjusted under 35 U.S.C. 154(b) by 624 days.

(21) Appl. No.: 18/246,759

(22) PCT Filed: Mar. 10, 2021

(86) PCT No.: PCT/CN2021/080089
§ 371 (c)(1),
(2) Date: Mar. 27, 2023

(87) PCT Pub. No.: WO2022/095316
PCT Pub. Date: May 12, 2022

(65) Prior Publication Data

US 2023/0399176 A1 Dec. 14, 2023

(30) Foreign Application Priority Data

Nov. 6, 2020 (CN) ......................... 202011231236.8
Dec. 4, 2020 (CN) ......................... 202011401588.3
(Continued)

(51) Int. Cl.
*B65G 1/137* (2006.01)
*G05D 1/00* (2024.01)
(Continued)

(52) U.S. Cl.
CPC ......... *B65G 1/1373* (2013.01); *G05D 1/0217* (2013.01); *G05D 1/0287* (2013.01);
(Continued)

(58) Field of Classification Search
CPC ............... B65G 1/1373; G06Q 10/047; G06Q 10/08345; G06Q 10/087; G06Q 10/083;
(Continued)

(56) References Cited

U.S. PATENT DOCUMENTS 12,462,220 B2 * 11/2025 Yu ........................ G06Q 10/047
2020/0140197 A1 5/2020 Yan
2020/0302391 A1 * 9/2020 Li ...................... G06Q 10/0875

FOREIGN PATENT DOCUMENTS

CN 107291078 A * 10/2017 ........... G06Q 1/0242
CN 108287544 A 7/2018
(Continued)

OTHER PUBLICATIONS

CN_110262471_EN (Year: 2019).*
(Continued)

*Primary Examiner* — Jacob S. Scott
*Assistant Examiner* — Erin Morris
(74) *Attorney, Agent, or Firm* — Husch Blackwell LLP

(57) ABSTRACT

Provided are a control method, apparatus, device and computer-readable storage medium of a warehousing system, where the method includes: determining a target workstation according to cargo information of a task to be assigned (S101); determining candidate material boxes according to cargo information of each of current material boxes and the cargo information of the task to be assigned, and selecting a candidate material box incurring a minimum transportation cost from the respective candidate material boxes as a target material box (S102); determining a target robot according to position information of the target material box (S103); and
(Continued)

S201 determining candidate workstations according to a number of slots to be occupied of the task to be assigned and a number of idle slots of respective workstations

S202 calculating an assignment efficiency value of each of the candidate workstations according to cargo information of assigned material boxes of the candidate workstations, distances between the respective material boxes and the candidate workstations, cargo information of material boxes not assigned to the candidate workstations, and remaining cargo information of the task to be assigned

S203 determining a candidate workstation having a maximum assignment efficiency value as the target workstation controlling the target robot to transport the target material box to the target workstation (S104). The method can improve the efficiency of ex-warehouse of cargoes.

19 Claims, 18 Drawing Sheets

(30) Foreign Application Priority Data

Dec. 4, 2020 (CN) ......................... 202011404457.0
Dec. 4, 2020 (CN) ......................... 202011404521.5

(51) Int. Cl.
*G06Q 10/047* (2023.01)
*G06Q 10/0834* (2023.01)
*G06Q 10/087* (2023.01)

(52) U.S. Cl.
CPC ..... *G06Q 10/047* (2013.01); *G06Q 10/08345* (2013.01); *G06Q 10/087* (2013.01)

(58) Field of Classification Search
CPC ............. G06Q 10/08; G06Q 10/08355; G05B 19/41865; G05B 19/41895; G05B 2219/32277; G05B 2219/50393; B25J 9/1664; B25J 9/1679; B25J 11/008; G05D 1/644; G05D 1/648; G05D 2107/70
See application file for complete search history.

(56) References Cited

FOREIGN PATENT DOCUMENTS

| | | | | | |
|---|---|---|---|---|---|
| CN | 108398924 | A | * | 8/2018 | ......... G05B 19/1895 |
| CN | 108846609 | A | | 11/2018 | |
| CN | 109625747 | A | | 4/2019 | |
| CN | 109934520 | A | | 6/2019 | |
| CN | 110097414 | A | | 8/2019 | |
| CN | 110163548 | A | | 8/2019 | |
| CN | 110262471 | A | * | 9/2019 | ........... G05D 1/0214 |
| CN | 110599110 | A | | 12/2019 | |
| CN | 110866723 | A | | 3/2020 | |
| CN | 111079990 | A | | 4/2020 | |
| CN | 111259807 | A | | 6/2020 | |
| CN | 111308995 | A | * | 6/2020 | ........... G05D 1/0242 |
| CN | 111461547 | A | | 7/2020 | |
| CN | 111646082 | A | * | 9/2020 | ........... B65G 1/0214 |
| CN | 111706383 | A | | 9/2020 | |
| CN | 111738651 | A | | 10/2020 | |
| JP | S6299816 | | * | 5/1987 | |
| JP | H1039929 | | * | 2/1998 | |
| JP | 2009541178 | A | * | 11/2009 | ........... G06Q 10/087 |
| JP | 2018508436 | A | * | 3/2018 | ......... G06Q 10/0833 |
| JP | 2020083654 | A | * | 6/2020 | ............... G08B 7/06 |
| JP | 2020527524 | A | | 9/2020 | |
| JP | 2020528390 | A | | 9/2020 | |
| KR | 101969570 | B1 | | 4/2019 | |
| WO | 2018081730 | A1 | | 5/2018 | |
| WO | 2019238865 | A1 | | 12/2019 | |

OTHER PUBLICATIONS

CN_108398924_EN (Year: 2018).*
CN_107291078_EN (Year: 2017).*
CN_111308995_EN (Year: 2020).*
JP_H1039929_EN (Year: 1998).*
JP_S6299816_EN (Year: 1987).*
Notification on Grant of the Patent Right for Invention issued in corresponding China App. Ser. No. 2020114015883 on Jan. 6, 2025.
Office Action issued in corresponding China App. Ser. No. 2020114044570 on Jan. 26, 2025.
Extended European Search Report issued Aug. 27, 2024 in corresponding Application Ser. No. EP2188021.9.
Office Action issued Sep. 13, 2024 in corresponding Application Ser. No. CN202011401588.3.
Office Action issued Oct. 9, 2024 in corresponding Application Ser. No. CN202011404521.5.
Wang, J., et al., "Experimental research of MPMD matching algorithm based on the GRPM underground positioning", Journal of China Coal Society (Apr. 2019), vol. 44, No. 4.

* cited by examiner

S201 determining candidate workstations according to a number of slots to be occupied of the task to be assigned and a number of idle slots of respective workstations

S202 calculating an assignment efficiency value of each of the candidate workstations according to cargo information of assigned material boxes of the candidate workstations, distances between the respective material boxes and the candidate workstations, cargo information of material boxes not assigned to the candidate workstations, and remaining cargo information of the task to be assigned

S203 determining a candidate workstation having a maximum assignment efficiency value as the target workstation

FIG. 2

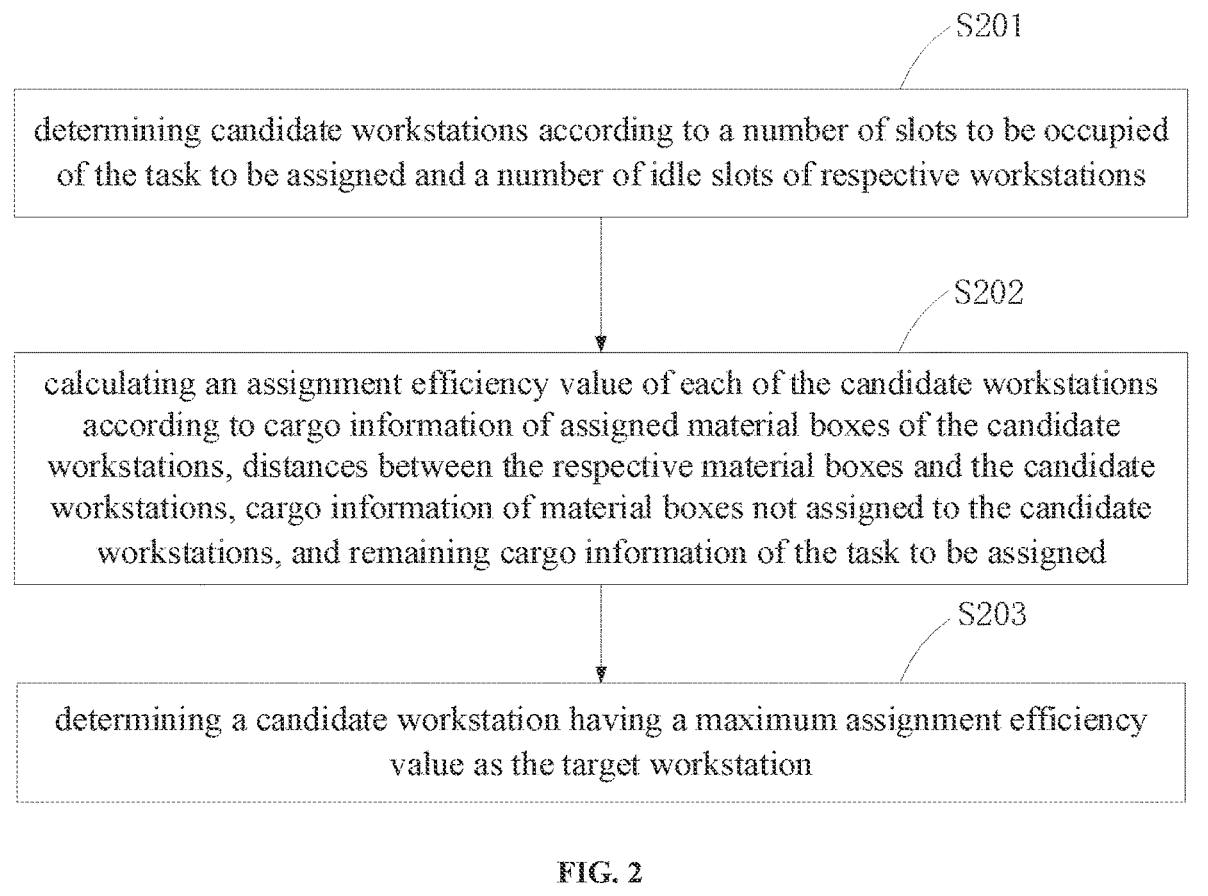

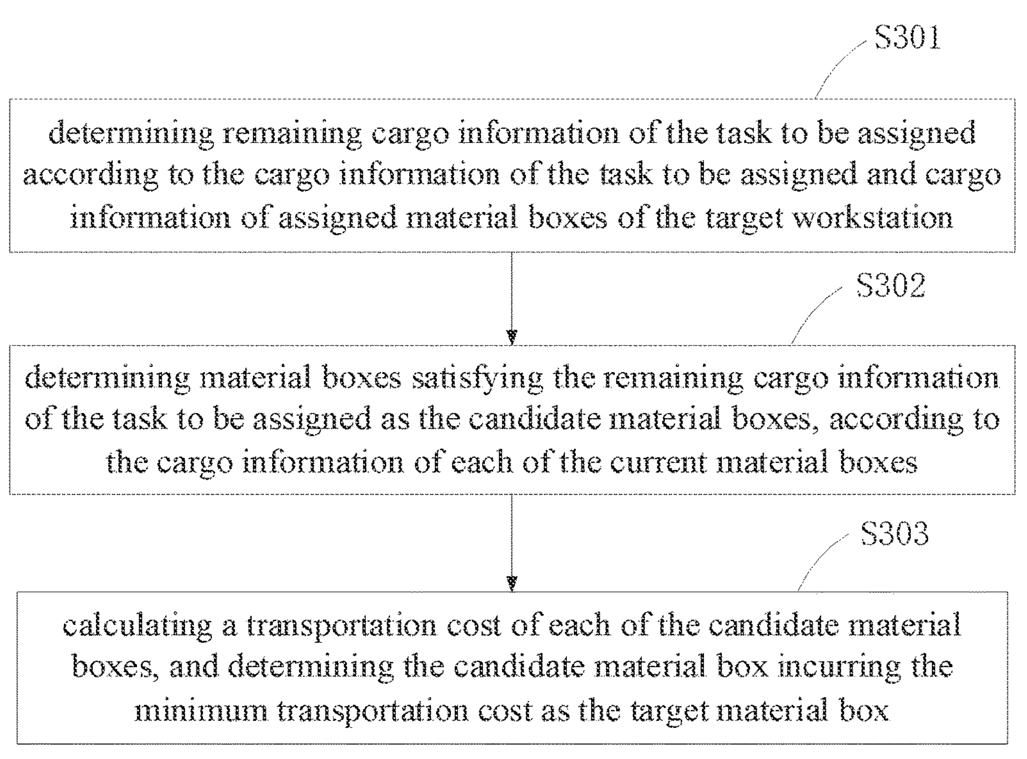

FIG. 3

S401 determining a target channel corresponding to the target material box according to the position information of the target material box

S402 determining a first target robot according to a position of each of the first robots in the target channel, wherein the first target robot is configured to transport the target material box from a storage position to a buffer position

S1001 obtaining a first reference value by adding a minimum value in a number of ex-warehouse tasks to be assigned of the target channel and a number of idle buffer positions to a minimum value in a number of in-warehouse tasks to be assigned of the target channel and a number of idle storage positions

S1002 obtaining a second reference value by subtracting a total number of assigned tasks of all matched first robots from a product of a number of the matched first robots and the upper threshold of tasks

S1003 selecting a minimum value in the first reference value and the second reference value as the number of the assignable tasks of the target channel

FIG. 10

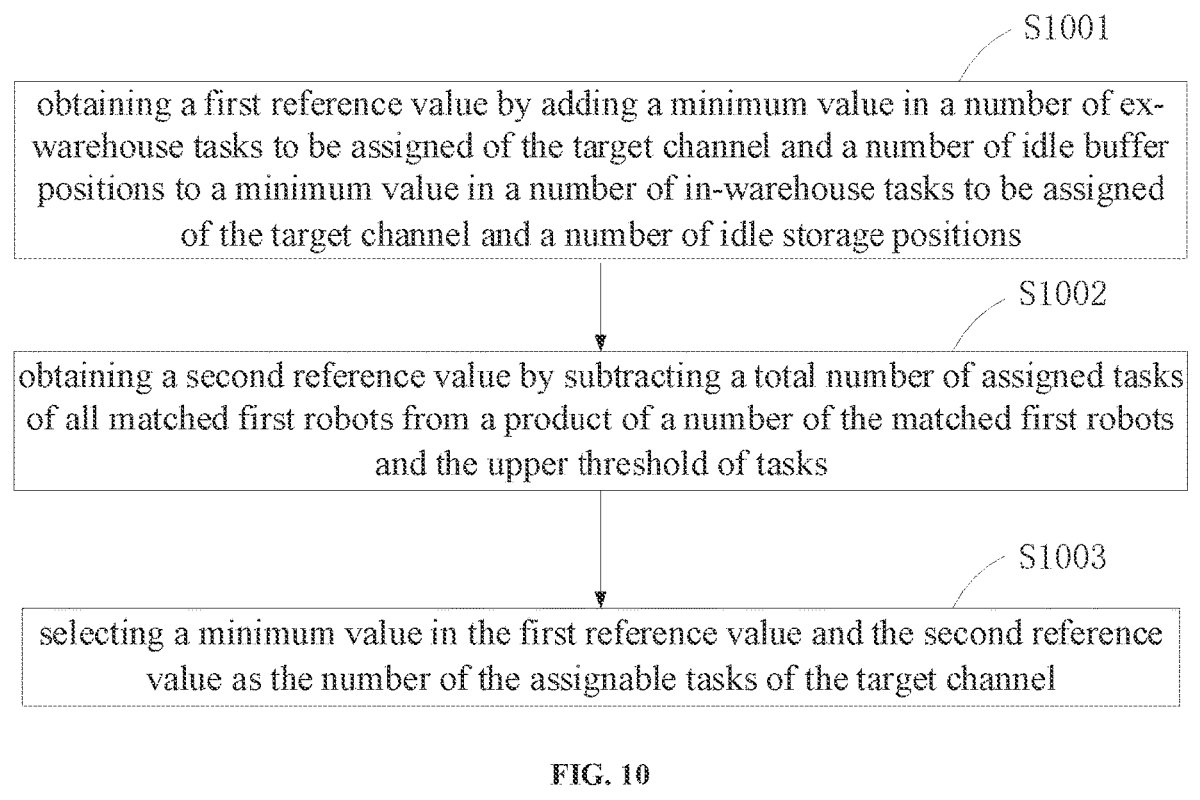

S1101 determining, according to a number of tasks to be assigned and a number of current second robots of each of initial warehouse areas, call-in warehouse areas and call-out warehouse areas from a plurality of initial warehouse areas

S1102 determining call-out second robots in each of the call-out warehouse areas

S1103 determining call-in second robots in each of the call-in warehouse areas from the respective call-out second robots, and scheduling the call-in second robots from the call-out warehouse area to a corresponding call-in warehouse area

S1104 determining, for each of warehouse areas to be matched, a second target robot corresponding to each of target material boxes in the warehouse area to be matched from idle second robots of the warehouse area to be matched

FIG. 11

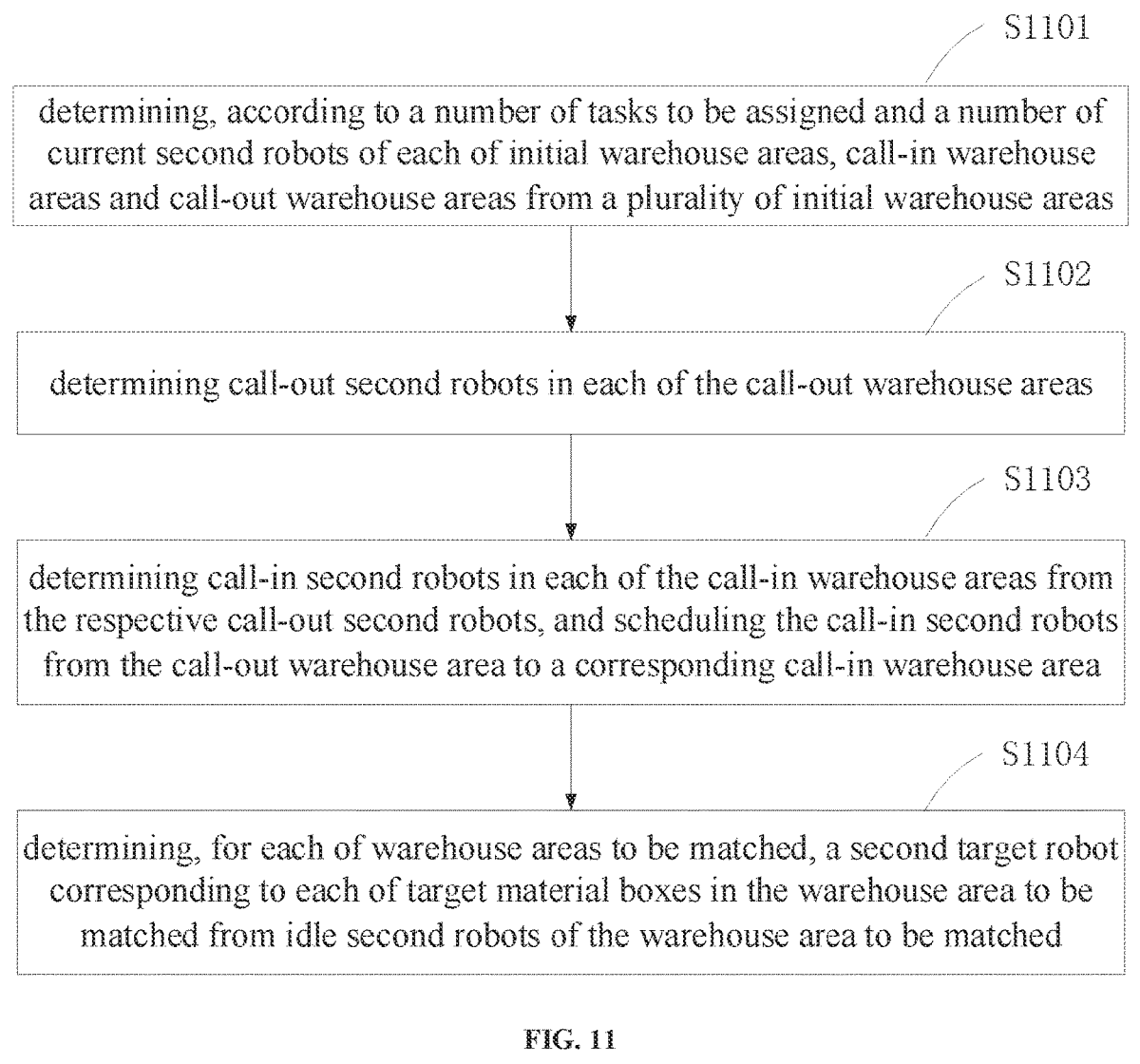

S1201 in a case where the number of the current second robots of the initial warehouse area is less than a second robot assignment number of the initial warehouse area, determining the initial warehouse area as the call-in warehouse area

S1202 in a case where the number of the current second robots of the initial warehouse area is greater than the second robot assignment number of the initial warehouse area, determining the initial warehouse area as the call-out warehouse area

FIG. 12

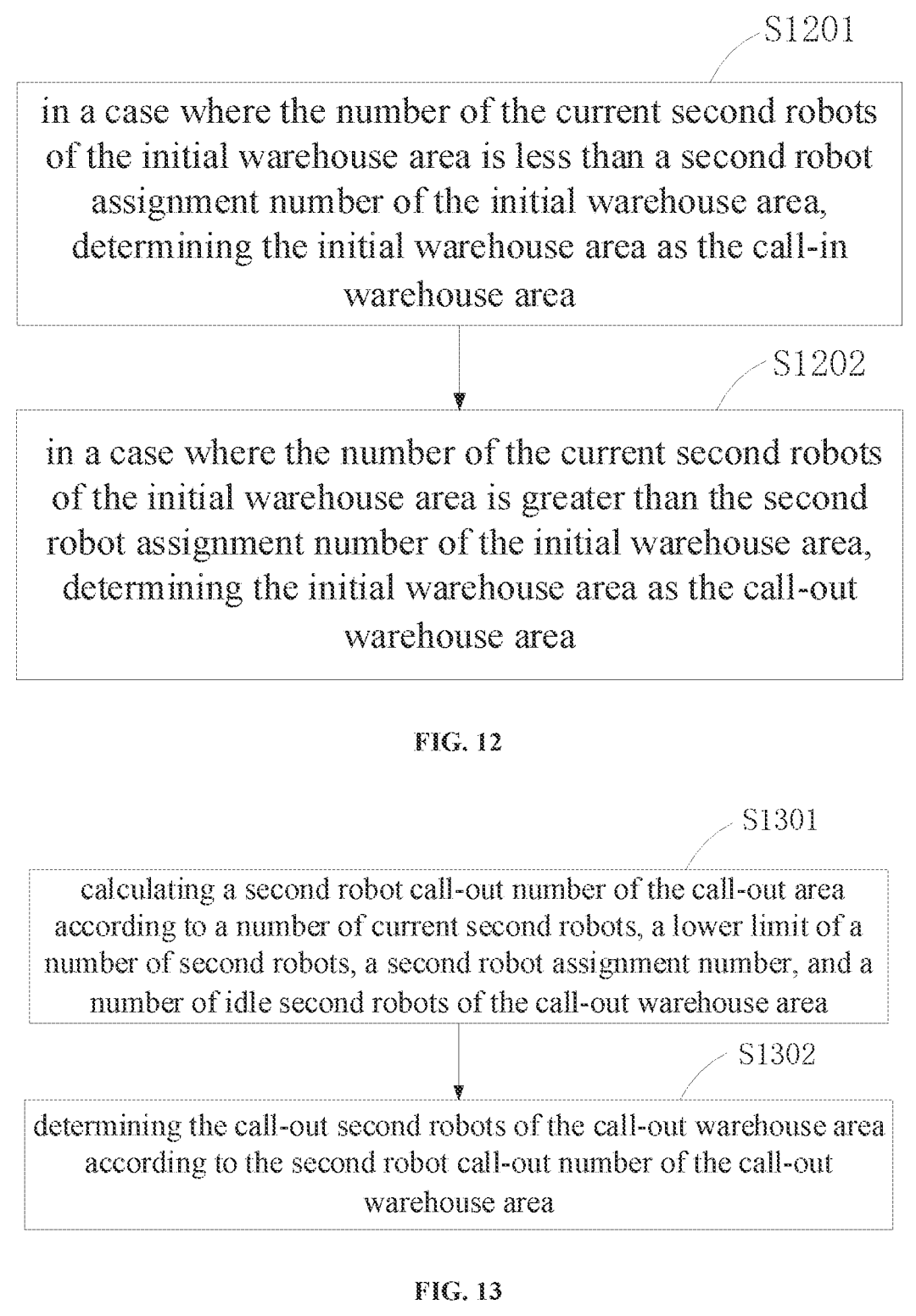

S1301 calculating a second robot call-out number of the call-out area according to a number of current second robots, a lower limit of a number of second robots, a second robot assignment number, and a number of idle second robots of the call-out warehouse area

S1302 determining the call-out second robots of the call-out warehouse area according to the second robot call-out number of the call-out warehouse area

FIG. 13

S1401 calculating a second robot call-in number of the call-in warehouse area according to a second robot assignment number, a number of current second robots, and an upper limit of a number of second robots of the call-in warehouse area

S1402 using a product of a ratio of the second robot call-in number of the call-in warehouse area to a sum of second robot call-in numbers of the respective call-in warehouse areas and a sum of second robot call-out numbers of the respective call-out warehouse areas, as a reference value

S1403 determining a minimum value in the reference value and the second robot call-in number of the call-in warehouse area as an actually required number of second robots of the call-in warehouse area

S1404 selecting, from the call-out second robots of each of the call-out warehouse areas, a call-out second robot closest to the call-in warehouse area as a call-in second robot of the call-in warehouse area according to the actually required number of second robots of the call-in warehouse area

FIG. 14

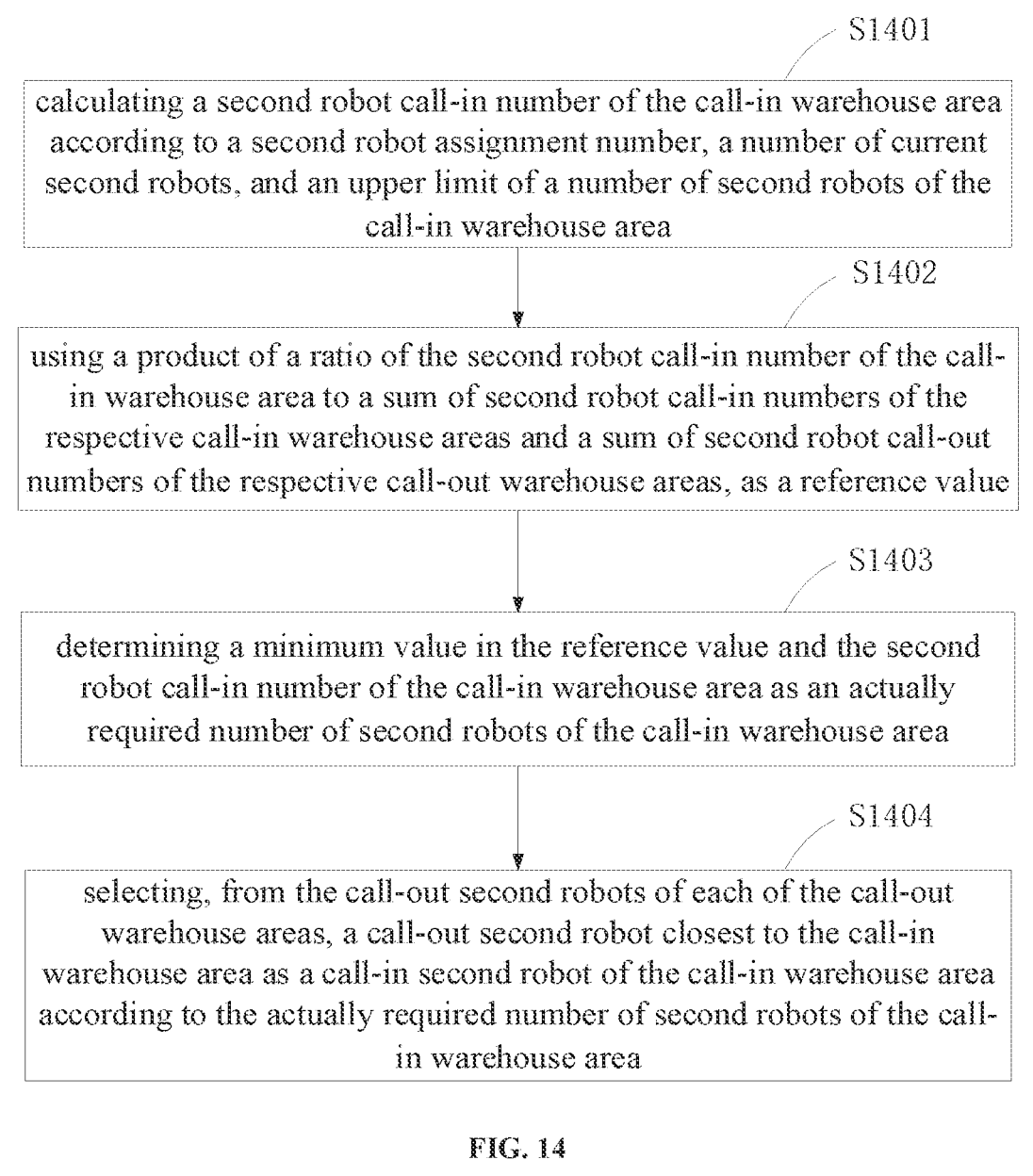

S1501 determining, according to types of tasks to be assigned and a number of the tasks to be assigned for the warehouse area to be matched, second target robots corresponding to each of workstations from the idle second robots of the warehouse area to be matched

S1502 matching tasks to be assigned of the workstation with the second target robots corresponding to the workstation

FIG. 15

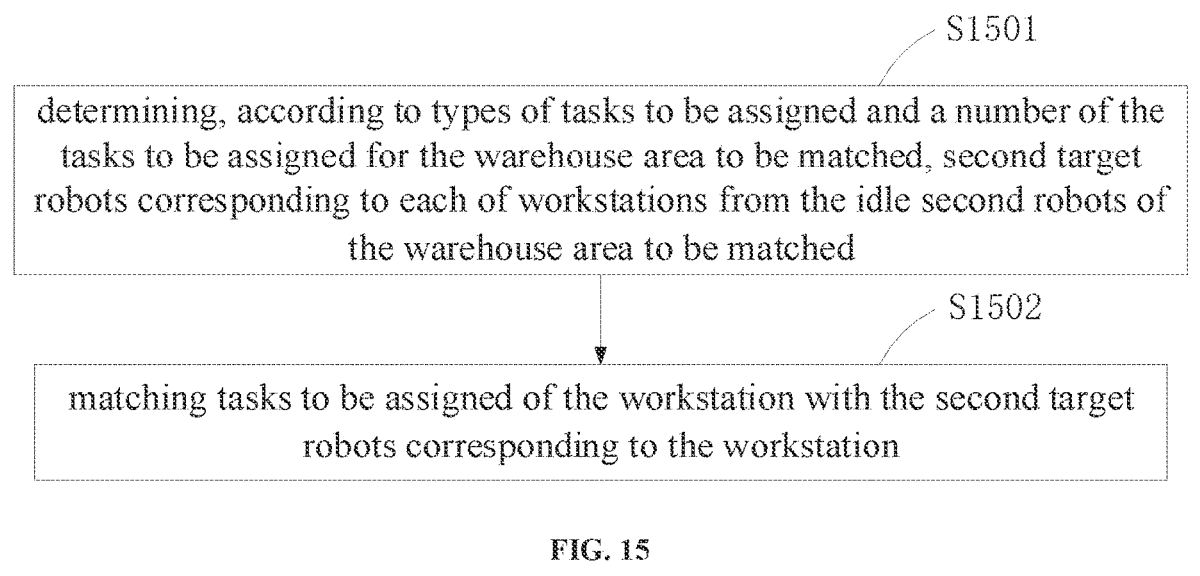

S1601 calculating, for each of the types of the tasks to be assigned, a first non-fixed weight of the type of the tasks to be assigned, according to a ratio of the number of the tasks to be assigned to a sum of numbers of the respective types of the tasks to be assigned, a fixed weight of the type of the tasks to be assigned, and an initial non-fixed weight of the type of the tasks to be assigned

S1602 assigning one of the idle second robots in the warehouse area to be matched, as a second target robot, to a workstation corresponding to a type of the tasks to be assigned having a highest first non-fixed weight

S1603 calculating, for each of the types of the tasks to be assigned, a second non-fixed weight of the type of the tasks to be assigned, according to the ratio of the number of the tasks to be assigned to the sum of numbers of the respective types of tasks to be assigned, the fixed weight of the type of the tasks to be assigned, and the first non-fixed weight of the type of the tasks to be assigned

S1604 in a case where a number of the idle second robots to be assigned and the number of the tasks to be assigned are both greater than 0, repeating the first non-fixed weight calculation step, the second target robot assignment step, and the second non-fixed weight calculation step, and using the second non-fixed weight of the type of the tasks to be assigned as the initial non-fixed weight of the type of the tasks to be assigned

FIG. 16

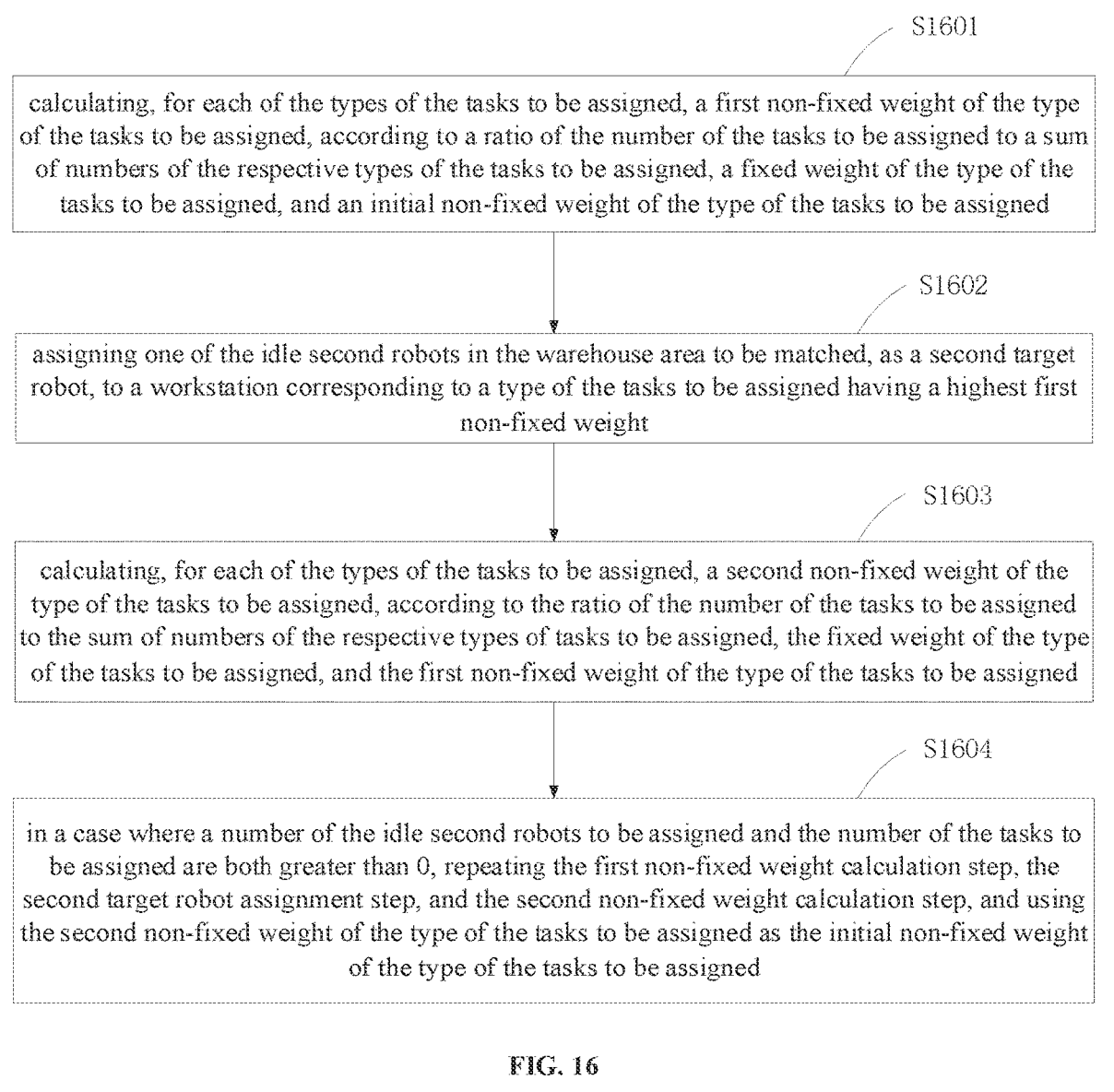

WAREHOUSING SYSTEM CONTROL METHOD AND APPARATUS, AND DEVICE AND COMPUTER-READABLE STORAGE MEDIUM

The present application claims priority to PCT Application No. PCT/CN2021/080089, filed Mar. 10, 2021, entitled "WAREHOUSING SYSTEM CONTROL METHOD AND APPARATUS, AND DEVICE AND COMPUTER-READABLE STORAGE MEDIUM," which is incorporated herein by reference in its entirety. The present disclosure claims priority to Chinese Patent Application No. 202011231236.8, filed with the China National Intellectual Property Office on Nov. 6, 2020 and entitled "CARGO EX-WAREHOUSE CONTROL METHOD AND APPARATUS, DEVICE AND COMPUTER-READABLE STORAGE MEDIUM," which is incorporated herein by reference in its entirety. The present disclosure claims priority to Chinese Patent Application No. 202011401588.3, filed with the China National Intellectual Property Office on Dec. 4, 2020 and entitled "CARGO EX-WAREHOUSE CONTROL METHOD AND APPARATUS, DEVICE AND COMPUTER-READABLE STORAGE MEDIUM," which is incorporated herein by reference in its entirety. The present disclosure claims priority to Chinese Patent Application No. 202011404457.0, filed with the China National Intellectual Property Office on Dec. 4, 2020 and entitled "WAREHOUSING SYSTEM CONTROL METHOD AND APPARATUS, DEVICE AND COMPUTER-READABLE STORAGE MEDIUM," which is incorporated herein by reference in its entirety. The present disclosure claims priority to Chinese Patent Application No. 202011404521.5, filed with the China National Intellectual Property Office on Dec. 4, 2020 and entitled "WAREHOUSING SYSTEM CONTROL METHOD AND APPARATUS, DEVICE AND COMPUTER-READABLE STORAGE MEDIUM," which is incorporated herein by reference in its entirety.

TECHNICAL FIELD

The present disclosure relates to the field of warehousing technologies, and in particular, to a warehousing system control method and apparatus, a device and a computer-readable storage medium.

BACKGROUND

In the related art, a warehousing system typically uses a transport robot to automatically transport a material box on a shelf to a workstation, to implement an ex-warehouse task. However, because the ex-warehouse task involves multiple factors, such as selecting a material box, selecting a workstation, selecting a robot, and the like, it is difficult to guarantee the efficiency for the ex-warehouse task.

SUMMARY

Embodiments of the present disclosure provide a warehousing system control method and apparatus, a device and a computer-readable storage medium, to solve one or more technical problems in the related art.

In order to achieve the above purpose, the present disclosure adopts the following technical solutions:

According to a first aspect of the embodiments of the present disclosure, there is provided a control method of a warehousing system, including:

- determining a target workstation according to cargo information of a task to be assigned;
- determining candidate material boxes according to cargo information of each of current material boxes and the cargo information of the task to be assigned, and selecting a candidate material box incurring a minimum transportation cost from the respective candidate material boxes as a target material box;
- determining a target robot according to position information of the target material box; and
- controlling the target robot to transport the target material box to the target workstation.

In an implementation, the determining the target workstation according to the cargo information of the task to be assigned includes:

- determining candidate workstations according to a number of slots to be occupied of the task to be assigned and a number of idle slots of respective workstations;
- calculating an assignment efficiency value of each of the candidate workstations according to cargo information of assigned material boxes of the candidate workstations, distances between the respective material boxes and the candidate workstations, cargo information of material boxes not assigned to the candidate workstations, and remaining cargo information of the task to be assigned; and
- determining a candidate workstation having a maximum assignment efficiency value as the target workstation.

In an implementation, the selecting the candidate material box incurring the minimum transportation cost from the respective candidate material boxes as the target material box includes:

- determining remaining cargo information of the task to be assigned according to the cargo information of the task to be assigned and cargo information of assigned material boxes of the target workstation;
- determining material boxes satisfying the remaining cargo information of the task to be assigned as the candidate material boxes, according to the cargo information of each of the current material boxes; and
- calculating a transportation cost of each of the candidate material boxes, and determining the candidate material box incurring the minimum transportation cost as the target material box.

In an implementation, robots include first robots, and the determining the target robot according to the position information of the target material box includes:

- determining a target channel corresponding to the target material box according to the position information of the target material box; and
- determining a first target robot according to a position of each of the first robots in the target channel, wherein the first target robot is configured to transport the target material box from a storage position to a buffer position.

In an implementation, the robots include second robots, and the determining the target robot according to the position information of the target material box further includes:

determining a second robot closest to the target material box as a second target robot according to the position information of the target material box, wherein the second target robot is configured to transport the target material box from the buffer position to the target workstation.

In an implementation, after controlling the target robot to transport the target material box to the target workstation, the method further includes:

controlling the second target robot to transport the target material box from the target workstation to a target shelf; and controlling the second target robot to stop under an idle buffer position of a storage shelf.

According to a second aspect of the embodiments of the present disclosure, there is provided a control method of a warehousing system, including:

selecting first robots in an idle state as first robots to be matched;

selecting, according to position information of a target material box, channels where the target material box is located as channels to be matched;

determining, for each of the first robots to be matched, a corresponding target channel and a corresponding first target robot according to a distance between the first robot to be matched and each of the channels to be matched and a number of tasks to be assigned for each of the channels to be matched; and assigning tasks to be assigned for the target channel to the corresponding first target robot.

In an implementation, the selecting the channels where the target material box is located as the channels to be matched includes:

selecting channels having tasks to be assigned but no first robots as first channels to be matched; and in a case where a number of the first channels to be matched is less than a number of the first robots to be matched, selecting channels having tasks to be assigned and first robots as second channels to be matched.

In an implementation, the assigning the tasks to be assigned for the target channel to the corresponding first target robot includes:

calculating a number of assignable tasks of the target channel;

in a case where the number of the assignable tasks is greater than 0, dividing, according to a number of first target robots, the target channel into a corresponding number of work areas;

selecting first target robots each having a number of assigned tasks less than an upper threshold of tasks as first robots to be assigned; and determining target tasks from the assignable tasks according to distances between the first robots to be assigned and a target material box corresponding to each of the assignable tasks, and numbers of work areas by which the first robots to be assigned move to the target material box corresponding to each of the assignable tasks, and assigning the target tasks to corresponding ones of the first robots to be assigned.

In an implementation, the calculating the number of the assignable tasks of the target channel includes:

obtaining a first reference value by adding a minimum value in a number of ex-warehouse tasks to be assigned of the target channel and a number of idle buffer positions to a minimum value in a number of in-warehouse tasks to be assigned of the target channel and a number of idle storage positions;

obtaining a second reference value by subtracting a total number of assigned tasks of all matched first robots from a product of a number of the matched first robots and the upper threshold of tasks; and selecting a minimum value in the first reference value and the second reference value as the number of the assignable tasks of the target channel.

According to a third aspect of the embodiments of the present disclosure, there is provided a control method of a warehousing system, wherein the warehousing system includes a plurality of warehouse areas, and the control method includes:

determining, according to a number of tasks to be assigned and a number of current second robots of each of initial warehouse areas, call-in warehouse areas and call-out warehouse areas from a plurality of initial warehouse areas;

determining call-out second robots in each of the call-out warehouse areas;

determining call-in second robots in each of the call-in warehouse areas from the respective call-out second robots, and scheduling the call-in second robots from the call-out warehouse area to a corresponding call-in warehouse area; and determining, for each of warehouse areas to be matched, a second target robot corresponding to each of target material boxes in the warehouse area to be matched from idle second robots of the warehouse area to be matched.

In an implementation, the determining, according to the number of tasks to be assigned and the number of the current second robots of each of the initial warehouse areas, the call-in warehouse areas and the call-out warehouse areas from the plurality of initial warehouse areas includes:

in a case where the number of the current second robots of the initial warehouse area is less than a second robot assignment number of the initial warehouse area, determining the initial warehouse area as the call-in warehouse area; and in a case where the number of the current second robots of the initial warehouse area is greater than the second robot assignment number of the initial warehouse area, determining the initial warehouse area as the call-out warehouse area;

wherein the second robot assignment number of the initial warehouse area is a product of a ratio of a number of unfinished tasks of the initial warehouse area to a sum of numbers of unfinished tasks of the warehousing system and a total number of second robots of the warehousing system.

In an implementation, the determining the call-out second robots in each of the call-out warehouse areas, includes:

calculating a second robot call-out number of the call-out area according to a number of current second robots, a lower limit of a number of second robots, a second robot assignment number, and a number of idle second robots of the call-out warehouse area; and determining the call-out second robots of the call-out warehouse area according to the second robot call-out number of the call-out warehouse area.

In an implementation, the determining the call-in second robots in each of the call-in warehouse areas from the respective call-out second robots includes:

calculating a second robot call-in number of the call-in warehouse area according to a second robot assignment number, a number of current second robots, and an upper limit of a number of second robots of the call-in warehouse area;

using a product of a ratio of the second robot call-in number of the call-in warehouse area to a sum of second robot call-in numbers of the respective call-in warehouse areas and a sum of second robot call-out numbers of the respective call-out warehouse areas, as a reference value;

determining a minimum value in the reference value and the second robot call-in number of the call-in warehouse area as an actually required number of second robots of the call-in warehouse area; and selecting, from the call-out second robots of each of the call-out warehouse areas, a call-out second robot closest to the call-in warehouse area as a call-in second robot of the call-in warehouse area according to the actually required number of second robots of the call-in warehouse area.

In an implementation, the determining the second target robot corresponding to each of the target material boxes in the warehouse area to be matched from the idle second robots of the warehouse area to be matched includes:

determining, according to types of tasks to be assigned and a number of the tasks to be assigned for the warehouse area to be matched, second target robots corresponding to each of workstations from the idle second robots of the warehouse area to be matched; and matching tasks to be assigned of the workstation with the second target robots corresponding to the workstation.

In an implementation, the determining, according to the types of the tasks to be assigned and the number of the tasks to be assigned for the warehouse area to be matched, the second target robots corresponding to each of the workstations from the idle second robots of the warehouse area to be matched includes:

calculating, for each of the types of the tasks to be assigned, a first non-fixed weight of the type of the tasks to be assigned, according to a ratio of the number of the tasks to be assigned to a sum of numbers of the respective types of the tasks to be assigned, a fixed weight of the type of the tasks to be assigned, and an initial non-fixed weight of the type of the tasks to be assigned;

assigning one of the idle second robots in the warehouse area to be matched, as a second target robot, to a workstation corresponding to a type of the tasks to be assigned having a highest first non-fixed weight;

calculating, for each of the types of the tasks to be assigned, a second non-fixed weight of the type of the tasks to be assigned, according to the ratio of the number of the tasks to be assigned to the sum of numbers of the respective types of tasks to be assigned, the fixed weight of the type of the tasks to be assigned, and the first non-fixed weight of the type of the tasks to be assigned; and in a case where a number of the idle second robots to be assigned and the number of the tasks to be assigned are both greater than 0, repeating the first non-fixed weight calculation step, the second target robot assignment step, and the second non-fixed weight calculation step, and using the second non-fixed weight of the type of the tasks to be assigned as the initial non-fixed weight of the type of the tasks to be assigned.

In an implementation, the matching the tasks to be assigned of the workstation with the second target robots corresponding to the workstation includes:

calculating an assignment value of each of the tasks to be assigned, according to priorities of the tasks to be assigned of the workstation and distances between target material boxes corresponding to the tasks to be assigned and the workstation;

taking, according to a number of the second target robots of the workstation, a corresponding number of tasks to be assigned having a maximum assignment value from the tasks to be assigned as target tasks; and calculating, for each of the second target robots, a value of matching the second target robot with each of the target tasks according to a distance between the second target robot and a target material box corresponding to each of the target tasks, and selecting a target task having a maximum value of matching to match the second target robot.

The above-mentioned technical solutions have at least the following advantageous or beneficial effects that: the material box transported from the storage shelf to the target workstation at the highest transportation efficiency can be selected from a plurality of candidate material boxes, to shorten the transportation time of the target robot to transport the target material box to the target workstation or reduce the transportation number of the target robot, thereby improving the efficiency of ex-warehouse of cargoes.

The foregoing is only for illustration, and is not intended to limit this specification in any way. In addition to the illustrative aspects, implementations, and features as described above, further aspects, implementations, and features of the present disclosure will become apparent with reference to the accompanying drawings and the following detailed description.

BRIEF DESCRIPTION OF THE DRAWINGS

To describe the technical solutions in the embodiments of the present disclosure or the related art more clearly, brief description will be made below on the accompanying drawings required for describing the embodiments or the related art. Apparently, the accompanying drawings in the following description merely relate to some of the embodiments of the present disclosure, and an ordinary skilled in the art can further derive others from these accompanying drawings.

FIG. 2 is a specific flowchart of determining call-in warehouse areas and call-out warehouse areas according to the first aspect of the embodiments of the present disclosure;

FIG. 3 is a specific flowchart of determining call-out robots according to the first aspect of the embodiments of the present disclosure;

FIG. 4 is a specific flowchart of determining call-in robots according to the first aspect of the embodiments of the present disclosure;

FIG. 5 is a flowchart of a control method of a warehousing system according to the first aspect of the embodiments of the present disclosure;

FIG. 6 is a specific flowchart of determining a target robot according to the first aspect of the embodiments of the present disclosure;

FIG. 10 is a specific flowchart of calculating a number of assignable tasks according to the second aspect of the embodiments of the present disclosure;

FIG. 11 is a flowchart of a control method of a warehousing system according to the third aspect of the embodiments of the present disclosure;

FIG. 12 is a specific flowchart of determining call-in warehouse areas and call-out warehouse areas according to the third aspect of the embodiments of the present disclosure;

FIG. 13 is a specific flowchart of determining call-out second robots according to the third aspect of the embodiments of the present disclosure;

FIG. 14 is a specific flowchart of determining call-in second robots according to the third aspect of the embodiments of the present disclosure;

FIG. 15 is a specific flowchart of matching tasks to be assigned according to the third aspect of the embodiments of the present disclosure;

FIG. 16 is a specific flowchart of assigning a second target robot according to the third aspect of the embodiments of the present disclosure;

DETAILED DESCRIPTION

Only some exemplary embodiments are briefly described below. As a person skilled in the art may realize, the described embodiments can be modified in various different ways without departing from the spirit or scope of the present disclosure. Therefore, the drawings and description are regarded as illustrative and not restrictive in nature.

Reference will now be made to FIGS. 1-6 to describe a control method of a warehousing system according to the first aspect of the embodiments of the present disclosure. The control method of the warehousing system according to embodiments of the present disclosure can be applied to a warehousing system to implement a cargo ex-warehouse task of the warehousing system.

Figure 1:
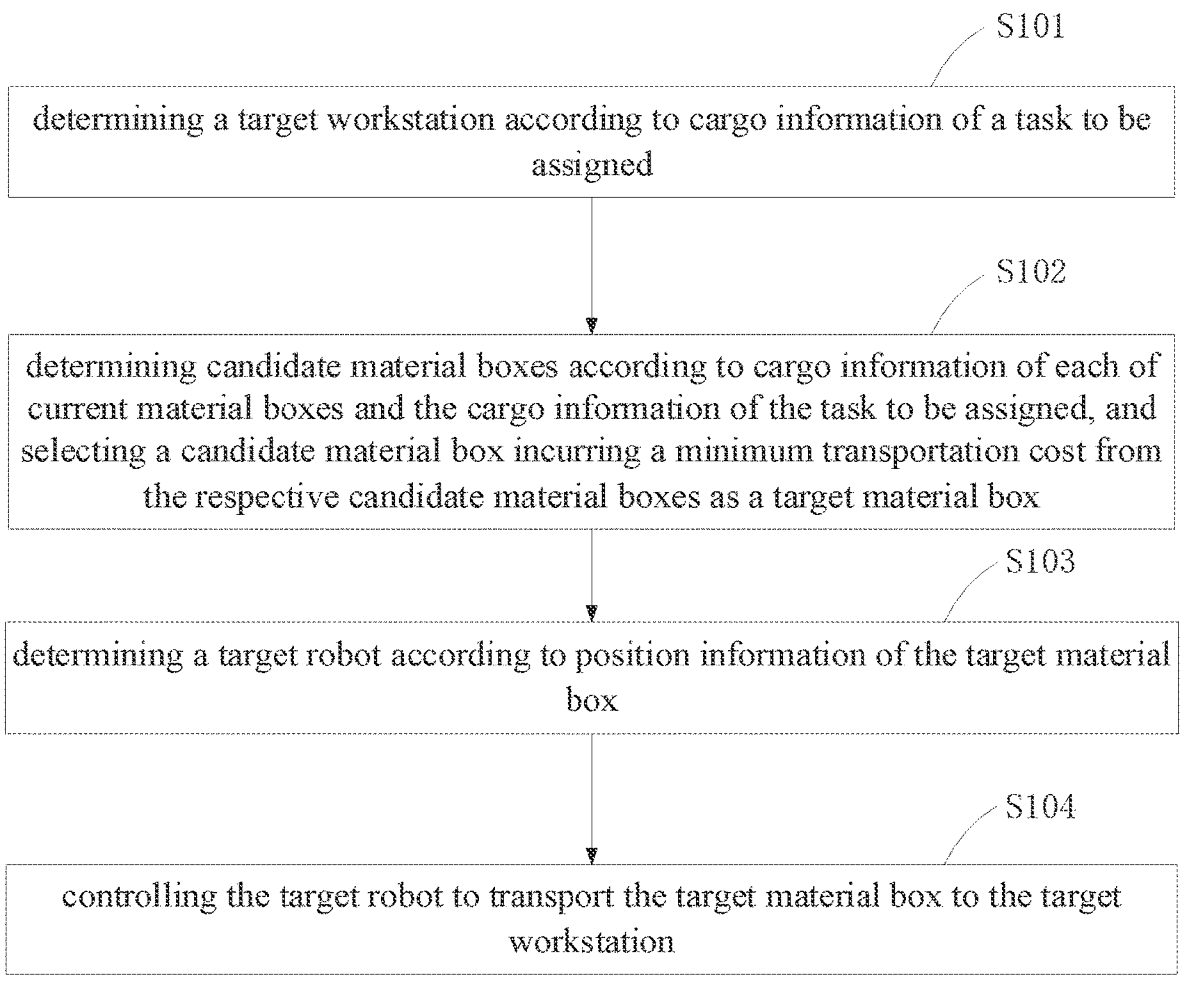
FIG. 1 is a flowchart of a control method of a warehousing system according to the first aspect of the embodiments of the present disclosure.

FIG. 1 is a flowchart of a control method of a warehousing system according to an embodiment of the present disclosure.

As shown in FIG. 1, the control method of the warehousing system can include:

- S101: determining a target workstation according to cargo information of a task to be assigned;
- S102: determining candidate material boxes according to cargo information of each of current material boxes and the cargo information of the task to be assigned, and selecting a candidate material box incurring a minimum transportation cost from the respective candidate material boxes as a target material box;
- S103: determining a target robot according to position information of the target material box; and
- S104: controlling the target robot to transport the target material box to the target workstation.

In an example, the task to be assigned may include a plurality of worksheets, and cargo information of the task to be assigned may include types and the number of target cargoes corresponding to each worksheet. The target workstation is configured for a worker to sort out target cargoes corresponding to the worksheet from the target material box. It should be noted that the workstations may be provided in plural, and one of the workstations may act as a target workstation of one task to be assigned, or a target workstation of a plurality of tasks to be assigned. Herein, the target workstation is a candidate workstation with the highest assignment efficiency.

In an example, the material box is used to store cargoes, and the current material box may be a material box placed on a storage shelf. According to cargo information of each current material box, the current material box at least partly matching the cargo information of the task to be assigned is selected as a candidate material box. The transportation cost of the candidate material box can be calculated according to the distance between the candidate material box and the target workstation, and the number of cargoes stored in the candidate material box and matching the target cargo of the task to be assigned.

It would be appreciated that the transportation cost of the candidate material box is proportional to the distance between the candidate material box and the target workstation, i.e., the distance between the candidate material box and the target workstation is smaller, the transportation cost of the candidate material box is lower; and the transportation cost of the candidate material box is inversely proportional to the number of cargoes stored in the candidate material box and matching the target cargo of the task to be assigned, i.e., the number of cargoes stored in the candidate box matching the target cargoes of the task to be assigned is larger, the transportation cost of the candidate material box is lower.

In an example, position information of the target material box may be position information of the storage shelf where the target material box is located. The robot may be an Automated Guided Vehicle (AGV), and the transport robot can travel along a predetermined navigation path, to transport the material box between the workstation and the storage shelf. The target robot can be specifically determined according to the position information of the storage shelf where the target material box is located.

After determining the target workstation, the target material box and the target robot, a material box transportation task is generated and sent to the target robot, to control the target robot to transport the target material box from the storage shelf to the target workstation.

In the embodiments of the present disclosure, robots of the warehousing system include first robots and second robots, and the material box transportation task can be simultaneously sent to a first target robot and a second target robot. Herein, the first target robot is used to transport the target material box from a target storage position on the shelf to a target buffer position, and the second target robot is used to transport the target material box from the target buffer position to the target workstation, to implement the material box ex-warehouse task.

Herein, selecting a first target robot and assigning a task can be implemented via the control method of the warehousing system according to the second aspect of the embodiments of the present disclosure, and selecting a second target robot and assigning a task can be implemented via the control method of the warehousing system according to the third aspect of the embodiments of the present disclosure.

According to the control method of the warehousing system according to the embodiments of the present disclosure, candidate material boxes are determined according to the cargo information of material boxes and the cargo information of the task to be assigned, and a candidate material box incurring a minimum transportation cost is selected from the respective candidate material boxes as a target material box, for example, the transportation cost of each candidate material box may be calculated according to two factors, namely the distance between each candidate material box and the target workstation, and the number of cargoes stored in each candidate material box and matching cargo information of the task to be assigned, and the candidate material box incurring the minimum transportation cost may be selected as a target material box. In this way, the material box transported from the storage shelf to the target workstation at the highest transportation efficiency can be selected from a plurality of candidate material boxes as the target material box, to shorten the transportation time of the target robot to transport the target material box to the target workstation or reduce the transportation number of the target robot, thereby improving the efficiency of ex-warehouse of cargoes.

In an implementation, as shown in FIG. 2, S101 includes:

S201: determining candidate workstations according to a number of slots to be occupied of the task to be assigned and a number of idle slots of respective workstations;

S202: calculating an assignment efficiency value of each of the candidate workstations according to cargo information of assigned material boxes of the candidate workstations, distances between the respective material boxes and the candidate workstations, cargo information of material boxes not assigned to the candidate workstations, and remaining cargo information of the task to be assigned; and S203: determining a candidate workstation having a maximum assignment efficiency value as the target workstation.

In an example, the workstation is provided with a sorting shelf that includes a plurality of slots for placing target cargoes sorted out of the target material box. The number of slots to be occupied can be determined according to the number and the type of target cargoes for the task to be assigned. Specifically, the number of slots to be occupied can be determined according to the number of worksheets of the task to be assigned. Herein, the target cargo required for each worksheet corresponds to one slot to be occupied, i.e., the number of slots to be occupied is equal to the number of worksheets of the task to be assigned. A workstation with the number of idle slots being equal to or greater than the number of slots to be occupied is selected as a candidate workstation, thereby guaranteeing that the number of idle slots of the candidate workstation is sufficient for placement of target cargoes corresponding to a plurality of worksheets.

It should be noted that assigned material boxes of a candidate workstation can be understood as all material boxes having been assigned to the candidate workstation. Material boxes not assigned to a candidate workstation can be understood as all material boxes, which have not been assigned to the candidate workstation, on a current storage shelf.

Exemplarily, an efficiency value E of each unassigned material box corresponding to a candidate workstation satisfies the following equation.

$$E=K/(1+h*d_0/d_{0max}),$$

where K is a first cargo number of the candidate workstation, do is a distance between an unassigned material box and the candidate workstation, $d_{0max}$ is a maximum value between the distance of the unassigned material box and the candidate workstation, and h is a preset value, for example, h=0.1.

An average efficiency value W of a candidate workstation can be derived by calculating an average value of efficiency values E of all unassigned material boxes corresponding to the candidate workstation. Optionally, an assignment efficiency value I of a candidate workstation satisfies the following equation:

$$I=(V+u*W_1)*(1+P)/C,$$

where V is a first cargo number of the candidate workstation, $W_1$ is an average efficiency value of the candidate workstation, P is a ratio of a priority value of a task to be assigned to the maximum priority value for all tasks to be assigned, C is the number of slots to be occupied, and u is a preset value.

According to the control method of the warehousing system according to the embodiments of the present disclosure, a first cargo number and a second cargo number of each candidate workstation are calculated, an average efficiency value of each candidate workstation is calculated according to the second cargo number and the distances between the candidate workstation and respective material boxes, and an assignment efficiency value of each candidate workstation is calculated according to the average efficiency value of the candidate workstation and the first cargo number, and finally a candidate workstation having the highest assignment efficiency value is selected from the respective candidate workstations as a target workstation. In this way, in combination with multiple factors, including a number of cargoes, having cargo information matching with the cargo information of the task to be assigned, in assigned material boxes and unassigned material boxes of each candidate workstation, the distances between respective material boxes and each candidate workstation, and the like, an assignment efficiency value of each candidate workstation can be obtained, and with reference to the respective assignment efficiency values, a candidate workstation having the highest assignment efficiency can be selected from the respective candidate workstations as a target workstation for the task to be assigned, so as to maximize the efficiency of ex-warehouse of cargoes.

In an implementation, as shown in FIG. 3, S102 includes:

S301: determining remaining cargo information of the task to be assigned according to the cargo information of the task to be assigned and cargo information of assigned material boxes of the target workstation; wherein the remaining cargo information of the task to be assigned can be understood as remaining cargo information of the task to be assigned that has not been satisfied by the assigned material boxes:

S302: determining material boxes satisfying the remaining cargo information of the task to be assigned as the candidate material boxes, according to the cargo information of each of the current material boxes; wherein the material boxes satisfying the cargo information of the task to be assigned can be material boxes with at least part of cargos currently stored therein that match the cargo information of the task to be allocated; and S303: calculating a transportation cost of each of the candidate material boxes, and determining the candidate material box incurring the minimum transportation cost as the target material box.

In an example, a transportation cost $U_1$ of a candidate material box satisfies the following equation:

$$U_1 = w_1\frac{d_1}{d_{1max}} - w_2\frac{s}{s_{max}} + w_3\frac{n_1}{n_{1max}} + w_4\frac{m_1}{m_{1max}} + w_5 * f_1,$$

where $d_1$ is a distance between the candidate material box and the target workstation, $d_{1max}$ is a maximum value of the distance between the candidate material box and the target workstation; s is a number of cargoes satisfying the cargo information of the task to be assigned, in the candidate material box, $s_{max}$ is a maximum value of the number of cargoes satisfying the cargo information of the task to be assigned, in the candidate material box; $n_1$ is a number of current ex-warehouse and in-warehouse tasks for a channel where the candidate material box is located, and $n_{1max}$ is a maximum value of the number of current ex-warehouse and in-warehouse tasks for channels where respective candidate material boxes are located; $m_1$ is a number of workstations assigned to the candidate material box, and $m_{1max}$ is a maximum value of the number of workstations assigned to candidate material boxes; $w_1$, $w_2$, $w_3$, $w_4$ and $w_5$ are preset coefficients; $f_1$ is 1 when the candidate box is in the storage position, and is 0 when the candidate box is not in the storage position.

In an implementation, as shown in FIG. 4, the robots include first robots, and S103 includes:

S401: determining a target channel corresponding to the target material box according to the position information of the target material box; and S402: determining a first target robot according to a position of each of the first robots in the target channel, wherein the first target robot is configured to transport the target material box from a storage position to a buffer position.

According to the position information of the first robots existing in the target channel, the first robot closest to the target material box is selected as the first target robot. As such, the movement distance of the first target robot to the target channel can be minimized, thus maximizing the efficiency of moving the first target robot to the target channel.

Exemplarily, the position information of the target material box may be position information of a storage shelf where the target material box is located, and a channel adjacent to the storage shelf where the target material box is located is a target channel. Herein, the channel is defined between two storage shelves adjacent to each other, the storage shelf has a storage position and a buffer position, the storage position and the buffer position are disposed at different layers, and the buffer position may be located at the bottom layer of the storage shelf. After determining the first target robot, a movement command is sent to the first target robot such that the first target robot moves from another channel to a portal of the target channel. Then, a first material box transporting task is sent to the first target robot, to control the first target robot to move the target material box located at the storage position to the buffer position.

Figures 5, 6:
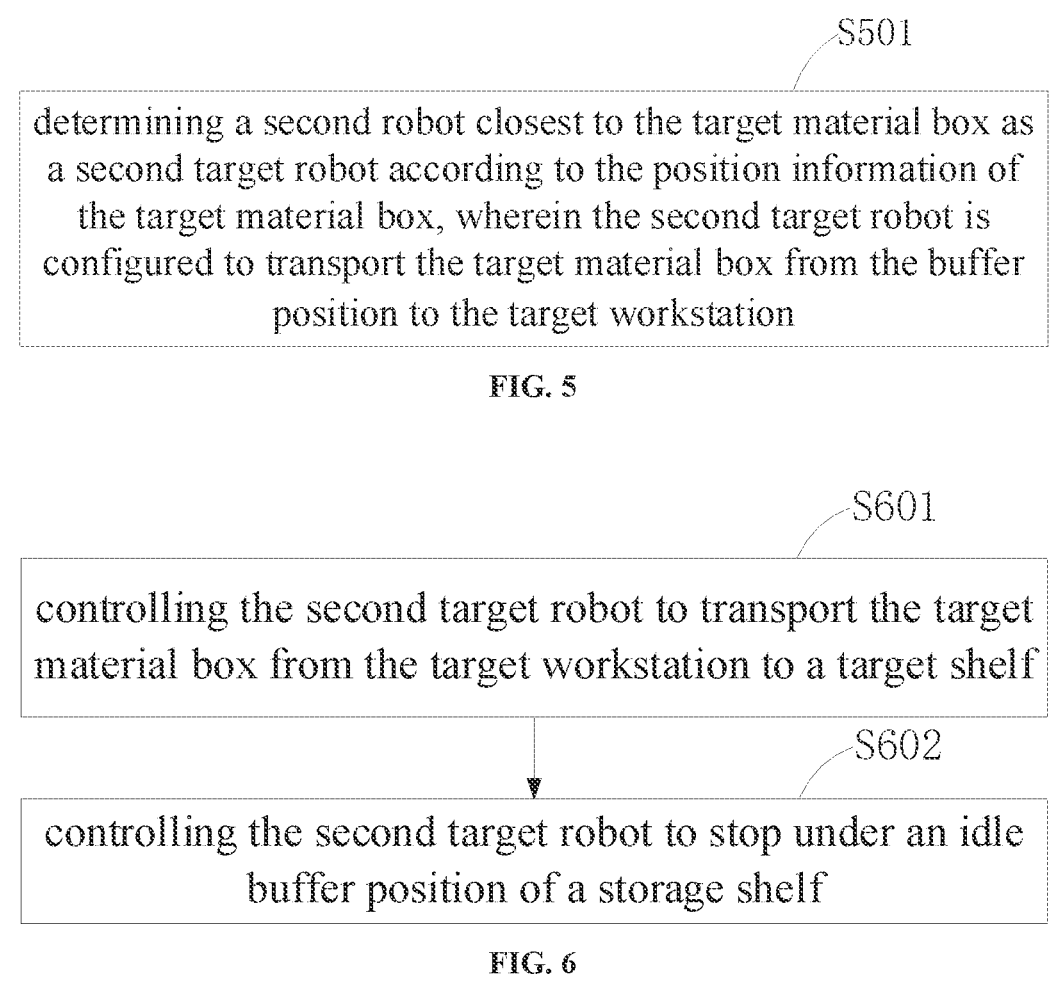

In an implementation, as shown in FIG. 5, the robots include second robots, and S103 further includes:

S501: determining a second robot closest to the target material box as a second target robot according to the position information of the target material box, wherein the second target robot is configured to transport the target material box from the buffer position to the target workstation.

Therefore, the movement distance of the second target robot to the buffer position where the target material box is located can be minimized, thereby improving the transportation efficiency of the second target robot.

Exemplarily, after determining the second target robot, a second material box transporting task is sent to the second target robot to control the second target robot to move along the target channel to a part below the buffer position of the storage shelf, and cause the same to transport the target material box located at the buffer position to the target workstation.

Optionally, as shown in FIG. 6, S103 further includes:

S601: controlling the second target robot to transport the target material box from the target workstation to a target shelf; and S602: controlling the second target robot to stop under an idle buffer position of a storage shelf.

Exemplarily, at S601, after the target material box is sorted at the target workstation, if the target material box still contains remaining cargoes, a material box returning task is sent to the second target robot, to control the second target robot to transport the target material box to the buffer position of the storage shelf. Further, the first robot transports the target material box from the buffer position to the storage position.

Exemplarily, at S602, after the second target robot completes the target material box transporting task, if no new material box transporting task is assigned, a target stopping point is assigned to the second target robot in an idle state.

Specifically, channels each having an idle buffer position are selected from respective current channels as candidate channels, a stop cost value of each candidate channel is calculated according to the number of tasks for each candidate channel and the distance between each candidate channel and the second target robot, a channel having the lowest stop cost is selected as the stop channel, a stopping point is selected randomly from stopping point s below the buffer position, in an idle state, of the stop channel, as the target stopping point of the second target robot, and a stopping task is then generated and sent to the second target robot, to control the second target robot to move to the target stopping point.

In an implementation, S103 further includes:

in a case where the target material box corresponds to a plurality of target workstations, an order of the second target robot accessing the respective target workstations is determined according to a preset configuration order. Herein, the preset configuration order is an ascending order of numbers of incoming material boxes of respective workstations.

It is to be understood that, in a case where a plurality of tasks to be assigned need to be handled simultaneously and the target material box corresponds to a plurality of target workstations, it is required to determine an order of the target material box accessing the plurality of target workstations. The second target robot may sequentially access the plurality of target workstations in the preset configuration order. In addition, the preset configuration order may be an ascending order of sums each obtained by adding the number of material boxes having reached each target workstation and the number of incoming material boxes.

In other examples of the present disclosure, the preset configuration order can also be determined according to a priority value of tasks to be assigned corresponding to respective target workstations, i.e., the second robot preferentially accesses the target workstation having the highest priority value. Alternatively, the preset configuration order may be an ascending order of distances between the current position of the target material box and the respective target workstations, i.e., the second target robot sequentially accesses the respective target workstations in an order from the nearest to the farthest.

Figure 22:
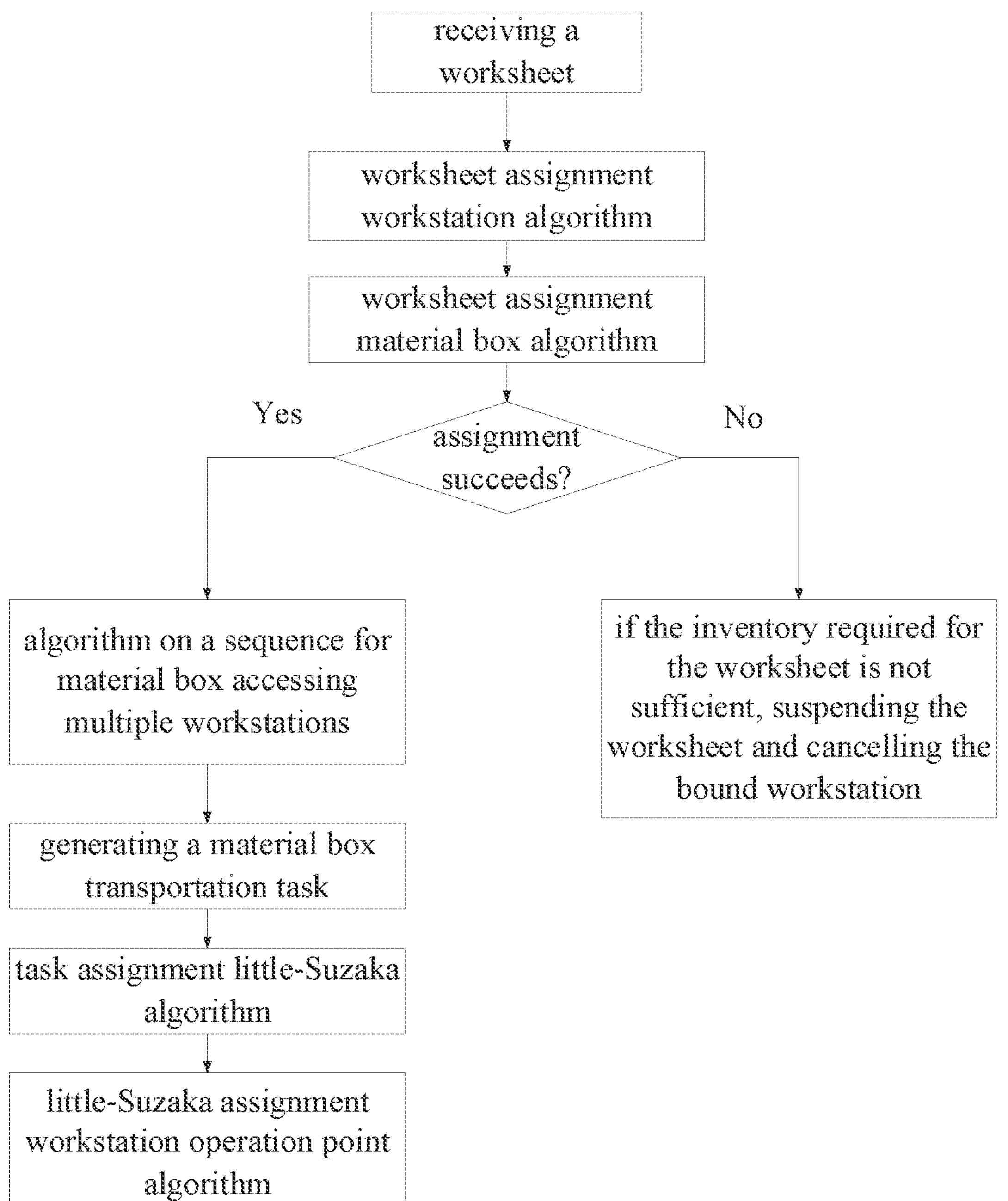
FIG. 22 is a specific flowchart of matching tasks to be assigned with a target robot according to the first aspect of the embodiments of the present disclosure.

Reference now will be made to FIG. 22 to describe the control method of the warehousing system according to the embodiments of the present application by means of a specific example.

As shown in FIG. 22, after receiving a worksheet (i.e., a task to be assigned), the target workstation is determined according to a worksheet assignment workstation algorithm. Specifically, an assignment efficiency value of each candidate workstation can be calculated according to the average efficiency value of each candidate workstation and the second cargo number, and a candidate workstation having the lowest assignment efficiency value is selected as the target workstation. Herein, the second cargo number is the number of cargoes on an assigned shelf of the candidate workstation having remaining cargo information that matches the cargo information of the worksheet. Then, a target material box is determined according to a worksheet assignment material box algorithm. Specifically, material boxes satisfying the cargo information of the worksheet are determined as candidate material boxes according to the cargo information of respective current material boxes, transportation costs of the respective candidate material boxes are calculated, and a candidate box incurring the lowest transportation cost is determined as the target material box. It should be noted that, if the cargo information of all candidate material boxes cannot satisfy the cargo information of the worksheet (i.e., if the inventory required for the worksheet is not sufficient, the target material box is unsuccessfully assigned), the worksheet is suspended and the bound target workstation is cancelled.

If the target material box is successfully assigned and the target material box corresponds to a plurality of target workstations simultaneously, a sequence of the target robot accessing the respective target workstations is determined according to an algorithm on a sequence for material box accessing multiple workstations, and a material box transportation task is generated and sent to the target robot. Then, the target robot is determined based on a task assignment little-Suzaka algorithm, and operation points having assigned to fewer target robots, of a workstation are selected and assigned to the target robot.

Reference will be made to FIGS. 7-10 below to describe a control method of a warehousing system according to the second aspect of the embodiments of the present disclosure. The control method of the warehousing system according to the embodiments of the present disclosure can be applied to a warehousing system for assigning a first robot to a channel with a task to be assigned, and assigning the task to be assigned to the first robot.

Figure 7:
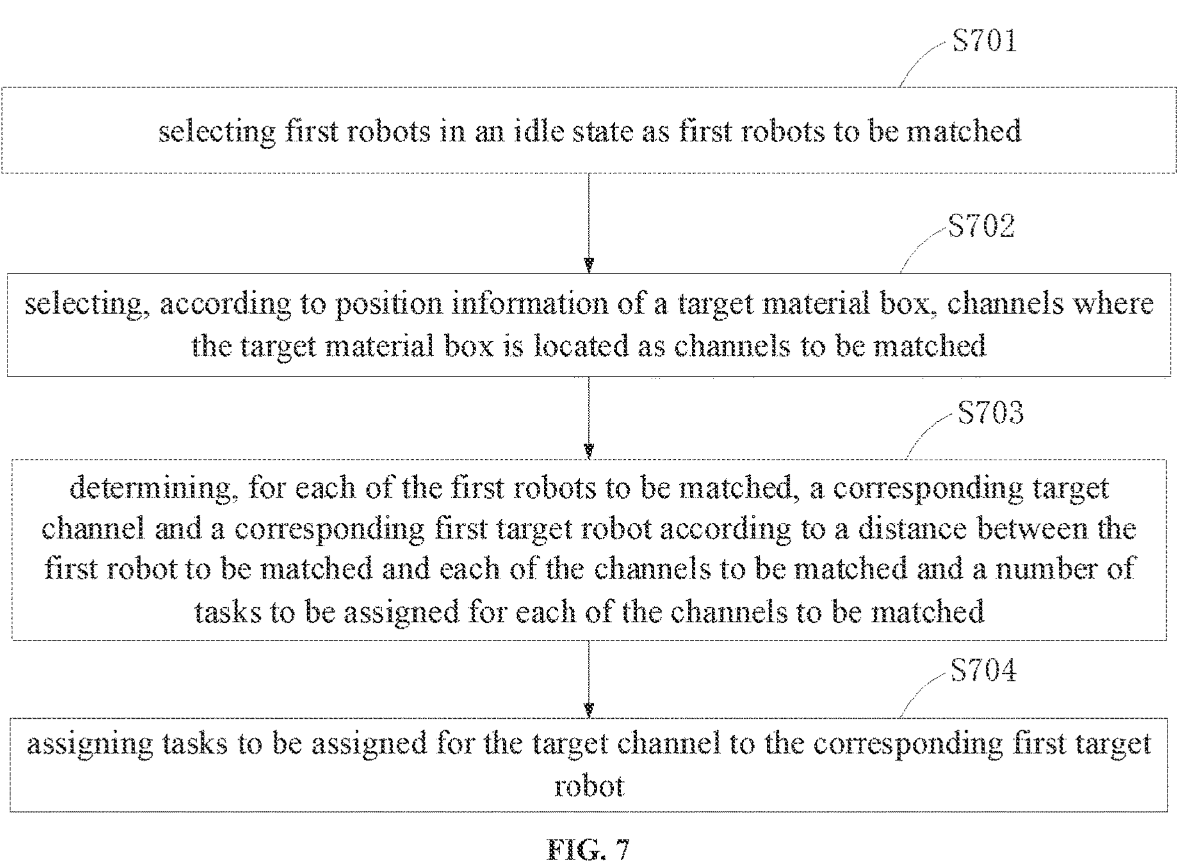
FIG. 7 is a flowchart of a control method of a warehousing system according to the second aspect of the embodiments of the present disclosure.

FIG. 7 is a flowchart of the control method of the warehousing system according to the embodiments of the present disclosure.

As shown in FIG. 7, the control method includes:

S701: selecting first robots in an idle state as first robots to be matched;

S702: selecting, according to position information of a target material box, channels where the target material box is located as channels to be matched;

S703: determining, for each of the first robots to be matched, a corresponding target channel and a corresponding first target robot according to a distance between the first robot to be matched and each of the channels to be matched and a number of tasks to be assigned for each of the channels to be matched; and

S704: assigning tasks to be assigned for the target channel to the corresponding first target robot.

Exemplarily, the first robots in an idle state refer to first robots having not performed a task, and may specifically include first robots with no task to be assigned within the channel and first robots having not performed a task outside the channel.

Exemplarily, the channel with a task to be assigned may be a channel with an ex-warehouse task to be assigned and/or an in-warehouse task to be assigned in the current state. Herein, the ex-warehouse task refers to a task of transporting a material box from a storage position of a shelf to a buffer position and then from the buffer position to a workstation; and the in-warehouse task may be a task of transporting a material box from a workstation to a buffer position of a shelf and then from the buffer position to a storage position.

Exemplarily, the distance between a first robot to be matched and a channel to be matched may be a Manhatten distance between a current position of the first robot to be matched and any portal of the channel to be matched, i.e., a sum of absolute wheelbases between the current position of the first robot to be matched and the portal of the channel to be matched in a standard coordinate system. The number of tasks to be assigned for a channel to be matched may be a sum of the number of current ex-warehouse tasks to be assigned and the number of current in-warehouse tasks to be assigned for the channel to be matched. Herein, the distance between a first robot to be matched and a channel to be matched is inversely proportional to a matching value of matching the first robot to be matched with the channel to be matched, i.e., the distance between the first robot to be matched and the channel to be matched is smaller, the matching value of matching the first robot to be matched with the channel to be matched is larger. The number of the tasks to be assigned for the channel to be matched is proportional to the matching value of matching the first robot to be matched with the channel to be matched, i.e., the number of the tasks to be assigned for the channel to be matched is larger, the matching value of matching the first robot to be matched with the channel to be matched is larger.

In an example, a KM (Kuhn-Munkres) algorithm may be used to derive a maximum weight match between a first robot to be matched and a channel to be matched in case of having completed matching.

Specifically, all first robots to be matched are added to a vertex set X, all channels to be matched are added to a vertex set Y, an edge (i, j) is connected between any vertex $x_i$ in the vertex set X and any vertex $y_j$ in the vertex set Y, and a matching value between the first robot i to be matched and the channel j to be matched is used as a weight of the edge (i, j), thereby constructing a weighted bipartite graph of all the first robots to be matched and the channels to be matched. Then, a maximum weight match of the weighted bipartite graph in case of having completed matching is derived via the KM algorithm, i.e., a match is derived such that all vertexes in the vertex set X respectively have a corresponding matched vertex from the vertex set Y while all vertexes in the vertex set Y respectively have a corresponding matched vertex from the vertex set X, and the sum of weights of all edges (i, j) in case of the match is greatest.

It would be appreciated that the maximum weight match derived via the KM algorithm in case of having completed matching is an optimum match between the first robots to be matched and the channels to be matched, and a sum of match values between the corresponding matched first robots and the target channel in each group is greatest. As such, an optimum matching result between the first robots to be matched and the channels to be matched can be derived rapidly and accurately, to guarantee overall that each first robot to be matched has a high matching value with each channel to be matched. In the case, a reasonable distribution of the first robots in the respective channels with tasks to be allocated can be attained, which is beneficial to improve the execution efficiencies of the ex-warehouse tasks and in-warehouse tasks.

Exemplarily, matched first robots and the target channel corresponding thereto are obtained by matching the first robots to be matched and the channels to be matched, and a movement command is sent to the matched first robots, to control the matched first robots to move to the portal of the target channel.

Exemplarily, the tasks to be assigned for the target channel are assigned to the corresponding matched first robots, and the tasks to be assigned are sequentially assigned to the matched first robots according to the priorities of the tasks to be assigned. For example, when there are a plurality of tasks to be assigned and the plurality of tasks to be assigned differ in priority, the tasks to be assigned having a preemption priority are preferentially assigned to the matched first robots, and the tasks to be assigned having a normal priority are assigned to the matched first robots.

In addition, assignment values between the respective tasks to be assigned and the first robots can be calculated, and according to an ascending order of the assignment values, the plurality of tasks to be assigned are sequentially assigned to the first robots. Herein, an assignment value can be calculated according to a distance between a matched first robot and a target material box position corresponding to each task to be assigned.

In a specific example, the warehousing system includes storage shelves, workstations, first robots and second robots. The storage shelves are provided in plural and spaced apart side by side, and a channel is defined between two adjacent storage shelves. The storage shelf is provided with a storage position and a buffer position which are disposed at different layers. For example, the storage position may be provided in plural and spaced apart in a vertical direction, and the buffer position is located below the plurality of storage positions and is located at the bottom layer of the storage shelf. The first robot is movable along the channel, for transporting a material box at the buffer position to the storage position, or transporting a material box at the storage position to the buffer position. The workstation is provided for a worker to sort out cargoes placed in a material box, or place cargoes into a material box. The second robot is movable between the storage shelf and the workstation, for transporting a material box at the buffer position to the workstation, or transporting a material box at the workstation to the buffer position. It should be noted that the first robot in the embodiments of the present disclosure may be a first robot.

By calculating matching values of matching first robots to be matched with respective channels to be matched according to distances between the first robots to be matched and the respective channels to be matched, and the number of tasks to be assigned for the respective channels to be matched, and selecting a channel to be matched having the highest matching value as a target channel of the first robots to be matched, the control method of the warehousing system according to the embodiments of the present disclosure can solve the following technical problem in the related art that the warehousing system has a low task execution efficiency caused by a poor matching degree between the first robots and the channels. By comprehensively taking the following two factors into consideration of matching, namely the distance between the first robot and the channel, and the number of the tasks to be assigned for the channel, the method according to the embodiments of the present disclosure can derive an optimum matching result between the first robot and the channel t rapidly and accurately, and a reasonable distribution of the first robots in the respective channels can be obtained, which is beneficial to improve the execution efficiency of the first robots for ex-warehouse tasks and in-warehouse tasks.

In an implementation, the channels to be matched include first channels to be matched and second channels to be matched.

Figure 8:
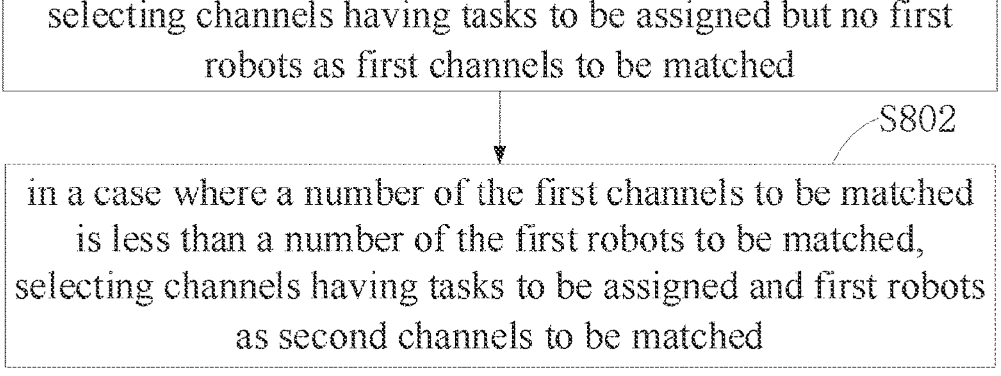
FIG. 8 is a specific flowchart of selecting a channel to be matched according to the second aspect of the embodiments of the present disclosure.

As shown in FIG. 8, S702 includes:

S801: selecting channels having tasks to be assigned but no first robots as first channels to be matched; and S802: in a case where a number of the first channels to be matched is less than a number of the first robots to be matched, selecting channels having tasks to be assigned and first robots as second channels to be matched.

It will be appreciated that, after selecting the first channels to be matched and the second channels to be matched, the first channels to be matched and the second channels to be matched collectively match with the first robots to be matched.

Exemplarily, in a case where the number of the first channels to be matched is less than the number of the first robots to be matched, channels having the task to be matched and the first robot to be matched are selected, a ratio of the number of the tasks to be assigned for the channel to the number of the first robots in the channel is calculated, and those channels are sequentially selected as the second channel to be matched according to an ascending order of the ratios, until a sum of the number of the first channels to be matched and the number of the second channels to be matched is equal to the number of the first robots to be matched, or the channels having the task to be assigned and the first robot have all been selected.

It should be noted that, in a case where the sum of the number of the first channels to be matched and the number of the second channels to be matched is equal to the number of the first robots to be matched, the number of vertexes in the vertex set X is the same as that in the vertex set Y, the KM algorithm is used to derive perfect matching results between the first robots to be matched and the channels to be matched, i.e., any vertex in the vertex set X has a unique matched vertex from the vertex set Y while all vertexes in the vertex set Y respectively have a unique matched vertex from the vertex set X, and the sum of weights of all edges (i, j) in case of the match is greatest.

In an implementation, a matching value $W_{ij}$ of matching a first robot to be matched to a channel to be matched satisfies the following equation:

$$W_2 = -u_1\frac{d_2}{d_{2max}} + u_2\frac{m_2}{m_{2max}} + u_3\frac{n_2}{n_{2max}},$$

where $d_2$ is the distance between a first robot $x_i$ to be matched and a channel $y_j$ to be matched, $d_{2max}$ is the maximum value of the distances between the respective first robots to be matched and the respective channels to be matched, $m_2$ is a number of tasks to be assigned for the channel $y_j$ to be matched, $m_{2max}$ is the maximum value of the numbers of tasks to be assigned for respective channels to be matched, $n_2$ is the number of the tasks having a preemption priority for the channel $y_j$ to be matched, $n_{2max}$ is the maximum value of the numbers of the tasks having a preemption priority for the respective channels to be matched, and $u_1$, $u_2$ and $u_3$ are preset values. For example, $u_1$ may be 700, $u_2$ may be 1, and $u_3$ may be 70000.

It should be noted that, in the above equation, in a case where a denominator of a certain fraction is zero, the calculation result of the fraction will be zero.

In an example, the distance $d_2$ between the first robot $x_i$ to be matched and the channel $y_i$ to be matched can be calculated in the following manner. The position p0 of the first robot relative to the channel where the first robot is located is acquired, positions p1 and p2 of two portals of the channel where the first robot is located are acquired, and positions p3 and 04 of two portals of the channel to be matched are acquired. The distance $d_2$ between the first robot $x_i$ to be matched and the channel $y_j$ to be matched satisfies the following equation: $d_2=\min(d_{01}+d_{13}, d_{01}+d_{14}, d_{02}+d_{23}, d_{02}+d_{24})$, where $d_{01}$ is a Manhatten distance between the position p0 and the position p1, $d_{13}$ is a Manhatten distance between the position p1 and the position p3, $d_{14}$ is a Manhatten distance between the position p1 and the position p4, $d_{02}$ is a Manhatten distance between the position p0 and the position p2, $d_{23}$ is a Manhatten distance between the position p2 and the position p3, and $d_{24}$ is a Manhatten distance between the position p2 and the position p4.

In an implementation, prior to matching the first robot to be matched and the channel to be matched, if the tasks to be assigned for the channel to be matched include a task having a preemption priority and the channel does not have a first robot therein, the first robot is preferentially assigned to the channel to be matched with the task having the preemption priority. For example, the first robot closest to the channel may be selected to match with the channel, or the first robot in the channel with no task having a preemption priority may be selected to match with the channel.

Figure 9:
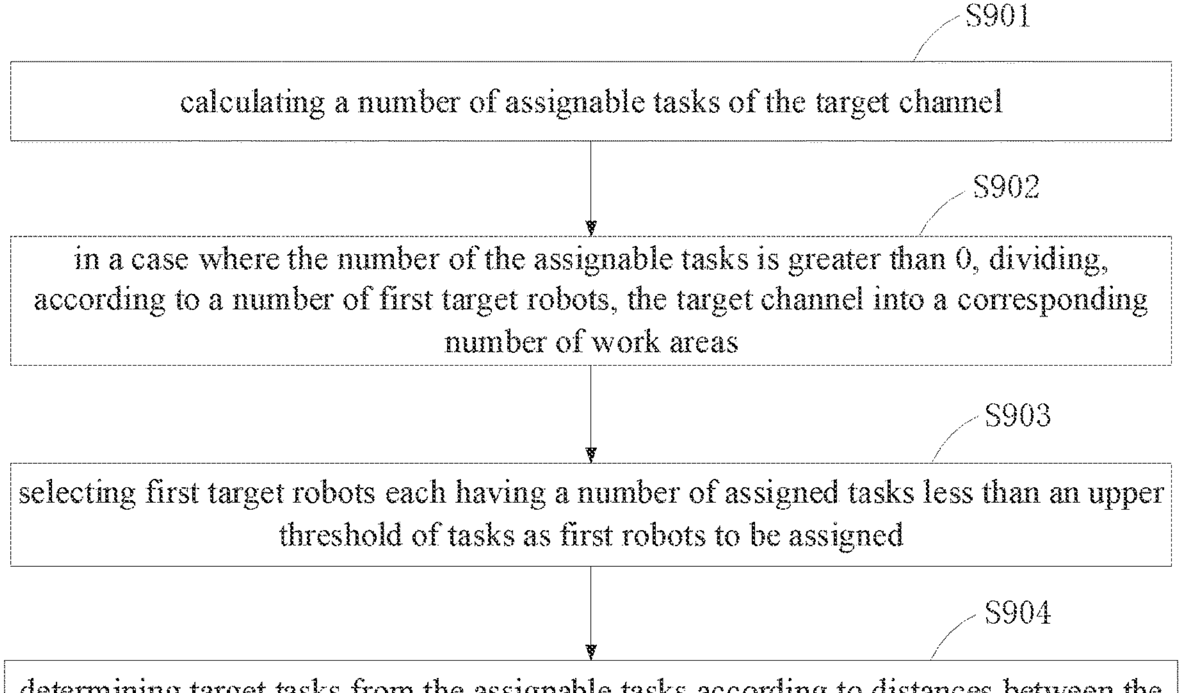
FIG. 9 is a specific flowchart of assigning a target task according to the second aspect of the embodiments of the present disclosure.

In an implementation, as shown in FIG. 9, S704 includes:

S901: calculating a number of assignable tasks of the target channel;

S902: in a case where the number of the assignable tasks is greater than 0, dividing, according to a number of matched first target robots, the target channel into a corresponding number of work areas; it can be understood that the number of the matched first robots is equal to the number of the work areas, and the matched first robots correspond to the work areas one by one;

S903: selecting first target robots each having a number of assigned tasks less than an upper threshold of tasks as first robots to be assigned; wherein the upper threshold of tasks is a maximum value of the number of tasks assignable to the matched first robot: and S904: determining target tasks from the assignable tasks according to distances between the first robots to be assigned and a target material box corresponding to each of the assignable tasks, and numbers of work areas by which the first robots to be assigned move to the target material box corresponding to each of the assignable tasks, and assigning the target tasks to corresponding ones of the first robots to be assigned.

Exemplarily, at S901, the number of the assignable tasks includes the number of assignable in-warehouse tasks and the number of assignable ex-warehouse tasks. Herein, the number of the assignable in-warehouse tasks can be calculated according to the number of in-warehouse tasks to be assigned and the number of idle buffer positions. The number of assignable ex-warehouse tasks can be calculated according to the number of ex-warehouse tasks to be assigned and the number of idle storage positions.

Exemplarily, at S902, in a case where the work areas are provided in plural, the numbers of storage positions corresponding to the respective work areas are the same, and the matched first robot performs an ex-warehouse task or an in-warehouse task in the corresponding work area.

Exemplarily, at S904, the distance between the first robot to be assigned and a target material box corresponding to each assignable task may be a distance between a position of the first robot to be assigned before performing the task and a buffer position where the target material box corresponding to the assignable in-warehouse task is located, or a distance between a position of the first robot to be assigned before performing the task and a storage position where the target material box corresponding to the assignable ex-warehouse task is located. The number of work areas by which the first robot moves to a target material box corresponding to each assignable task refers to a number of work areas by which the first robot to be assigned moves from the current position to the position where the target material box is located in the process of performing the assignable task.

It will be appreciated that, the distance between the first robot to be assigned and the target material box corresponding to the assignable task is inversely proportional to an assignment value of assigning the assignable task to the first robot to be assigned, i.e., the distance between the first robot to be assigned and the target material box corresponding to the assignable task is smaller, the assignment value of assigning the assignable task to the first robot to be assigned is larger. The number of work areas by which the first robot to be assigned moves to a target material box corresponding to each assignable task is inversely proportional to the assignment value of assigning the assignable task to the first robot to be assigned, i.e., the number of work areas by which the first robot to be assigned moves to a target material box corresponding to each assignable task is smaller, the assignment value of assigning the assignable task to the first robot to be assigned is larger.

Optionally, an assignment value Uij of assigning an assignable task to a first robot satisfies the following equation:

$$U_2 = -e_1 * f_2 - e_2 * \frac{g}{g_{max}},$$

where $f_2$ is the number of work areas across which a first robot ai to be assigned performs the assignable task, g is a movement distance of the first robot ai to be assigned to perform the assignable task, $g_{max}$ is a maximum value in the movement distances of the respective first robots ai to be assigned to perform the assignable task, and e1 and e2 are preset values, e.g., e1 may be 700, and e2 may be 1.

It should be noted that, in the above equation, in a case where the denominator of a certain fraction is zero, the calculation result of the fraction is zero.

In addition, in a case where the work area where the target material box corresponding to the assignable task is located is at an end of the target channel, and the first robots to be assigned is not within the work area where the target material box is located, the assignment value of assigning the assignable task to the first robot to be assigned approaches 0.

In an example, the KM algorithm may be used to derive a maximum weight match between a first robot to be matched and an assignable task in case of having completed matching.

Specifically, all first robots to be assigned are added to a vertex set P, all tasks to be assigned are added to a vertex set Q, an edge (i, j) is connected between any vertex $p_i$ in the vertex set P and any vertex $q_j$ in the vertex set Q, and a matching value between the first robot i to be assigned and the assignable task is used as a weight of the edge (i, j), thereby constructing a weighted bipartite graph of all the first robots to be assigned and the tasks to be assigned. Then, a maximum weight match of the weighted bipartite graph in case of having completed matching is derived via the KM algorithm, i.e., a match is derived such that all vertexes in the vertex set P respectively have a corresponding vertex from the vertex set Q while all vertexes in the vertex set Q respectively have a corresponding vertex from the vertex set P, and the sum of weights of all edges (i, j) in case of the match is largest.

It would be appreciated that the maximum weight match derived via the KM algorithm in case of having completed matching is an optimum assignment way of the first robots to be assigned and the tasks to be assigned, and a sum of assignment values between the first robots to be assigned and the corresponding tasks to be assigned in each group is largest. As such, an optimum assignment result of the first robots to be assigned and the tasks to be assigned can be derived rapidly and accurately, to guarantee a highest assignment value between the respective first robots to be assigned and the respective task to be assigned, thereby improving the execution efficiency of the first robot performing the ex-warehouse tasks or the in-warehouse tasks in the channel.

Optionally, as shown in FIG. 10, S901 includes:

- S1001: obtaining a first reference value by adding a minimum value in a number of ex-warehouse tasks to be assigned of the target channel and a number of idle buffer positions to a minimum value in a number of in-warehouse tasks to be assigned of the target channel and a number of idle storage positions;
- S1002: obtaining a second reference value by subtracting a total number of assigned tasks of all matched first robots from a product of a number of the matched first robots and the upper threshold of tasks; wherein the upper threshold of tasks is a maximum value of the number of tasks assignable to a single matched first robot; and
- S1003: selecting a minimum value in the first reference value and the second reference value as the number of the assignable tasks of the target channel.

In an example, the number of assignable ex-warehouse tasks and the number of assignable in-warehouse tasks can be calculated according to the number of assignable tasks, specifically including:

- in a case where the number of the assignable tasks is greater than 0 and the number of ex-warehouse material boxes of the target channel is greater than the product of the number of idle buffer positions and the preset value $v_1$, calculating a number of assignable in-warehouse tasks, the number of assignable in-warehouse tasks is the minimum value in the number of the assignable tasks, the number of in-warehouse material boxes located at the buffer position, and the number of idle storage positions, where $v_1$ may be 0.5; and
- calculating a number of assignable ex-warehouse tasks, the number of assignable ex-warehouse tasks is the minimum value in a difference between the number of assignable tasks and the number of assignable in-warehouse tasks, the number of ex-warehouse tasks to be assigned, the number of idle buffer positions, and a comparison value; the comparison value $C_0$ satisfies the following equation: $C_0=\max(0, j*v_2-k)$, where j is the number of idle buffer positions, k is the number of ex-warehouse material boxes, and the preset value $v_2$ may be 0.8.

Further, the calculating the number of the assignable ex-warehouse tasks and the number of the in-warehouse tasks according to the number of the assignable tasks further includes:

- in a case where the number of the assignable tasks is greater than 0 and the number of ex-warehouse material boxes of the target channel is less than or equal to a product of the number of idle buffer positions and the preset value $v_1$, calculating a number of assignable ex-warehouse tasks, the number of assignable ex-warehouse tasks is the minimum value in the number of assignable tasks, the number of ex-warehouse tasks to be assigned, the number of idle buffer positions and a comparison value is calculated; the comparison value $C_0$ satisfies the following equation: $C_0=\max(0, j*v_2-k)$, where j is the number of idle buffer positions, k is the number of ex-warehouse material boxes, and the preset value $v_2$ may be 0.8; and
- calculating a number of assignable in-warehouse tasks, the number of assignable in-warehouse tasks is the minimum value in the difference between the number of assignable tasks and the number of assignable ex-warehouse tasks, the number of in-warehouse material boxes located at the buffer position, and the number of idle storage positions.

Reference will be made to FIGS. 11-17 below to describe a control method of a warehousing system according to the third aspect of the embodiments of the present disclosure. The control method of the warehousing system according to the embodiments of the present disclosure can be applied to a warehousing system for assigning second robots to channels with tasks to be assigned, and assigning the tasks to be assigned to the second robots.

FIG. 11 is a flowchart of a control method of a warehousing system according to the embodiments of the present disclosure. As shown in FIG. 11, the method includes:

- S11011: determining, according to a number of tasks to be assigned and a number of current second robots of each of initial warehouse areas, call-in warehouse areas and call-out warehouse areas from a plurality of initial warehouse areas;

S1102: determining call-out second robots in each of the call-out warehouse areas;

S1103: determining call-in second robots in each of the call-in warehouse areas from the respective call-out second robots, and scheduling the call-in second robots from the call-out warehouse area to a corresponding call-in warehouse area; and S1104: determining, for each of warehouse areas to be matched, a second target robot corresponding to each of target material boxes in the warehouse area to be matched from idle second robots of the warehouse area to be matched. Herein, the second target robots are used to perform the corresponding tasks to be assigned, i.e., transporting the target material boxes from storage positions to target workstations.

Exemplarily, the warehousing system includes a plurality of warehouse areas, each warehouse area is provided with storage shelves and workstations, and the second robots are assigned to the respective warehouse areas to perform tasks corresponding to the respective warehouse areas. The initial warehouse areas refer to respective warehouse areas before the second robots are not scheduled.

The tasks to be assigned of the initial warehouse areas refer to tasks having not been assigned to the second robots, of the initial warehouse areas. The number of current second robots within the initial warehouse areas refers to the number of second robots located within the initial warehouse areas, including second robots performing tasks and second robots in an idle state in the initial warehouse area. The call-in warehouse areas refer to initial warehouse areas in which second robots should be called, and the call-out warehouse areas refer to initial warehouse areas out of which second robots should be called.

Exemplarily, a product of a ratio of a number of assignable tasks to be assigned of an initial warehouse area to a sum of numbers of tasks to be assigned of all initial warehouse areas and a total number of second robots of all the initial warehouse areas, then the product is compared with a number of current second robots within the initial warehouse area, to determine whether a second robot needs to be called in or out of the initial warehouse area, and determine whether the initial warehouse area is a call-in warehouse area or a call-out warehouse area.

In a specific example, each initial warehouse area includes storage shelves, workstations, first robots and second robots. The storage shelves are provided in plural and spaced apart side by side, and a channel is defined between two adjacent storage shelves. The storage shelf is provided with a storage position and a buffer position which are disposed at different layers. For example, the storage position may be provided in plural and spaced apart in a vertical direction, and the buffer position is located below the plurality of storage positions and is located at the bottom layer of the storage shelf. The first robot is movable along the channel, for transporting a material box at the buffer position to the storage position, or transporting a material box at the storage position to the buffer position. The workstation is provided for a worker to sort out cargoes placed in a material box, or place cargoes into a material box. The second robot is movable between the storage shelf and the workstation, for transporting a material box at the buffer position to the workstation, or transporting a material box at the workstation to the buffer position.

Exemplarily, call-out second robots in each call-out warehouse area may be determined, from second robots in an idle state in the call-out warehouse area, or from second robots in an idle state in the call-out warehouse area and second robots performing a material box return task and having a distance away from a task destination being not longer than a preset distance threshold. Herein, the second robots in an idle state refer to second robots currently having not being assigned with a task, and the material box return task refers to a second robot transporting a material box from a storage shelf to another storage shelf.

Exemplarily, call-in second robots of each call-in warehouse area are determined from respective call-out second robots, for each call-in warehouse area, the call-out robot closest to the call-in warehouse area is selected from all call-out second robots as a call-in second robot of the call-in warehouse area, and a movement command is sent to the call-in second robot, to control the call-in second robot to move from the current call-out warehouse area to the assigned call-in warehouse area.

According to the warehousing system control method according to the embodiments of the present disclosure, call-in warehouse areas and call-out warehouse areas are determined from respective initial warehouse areas according to the number of tasks to be assigned of the respective initial warehouse areas and the number of current second robots, call-out second robots of the call-out warehouse areas are determined and call-in second robots of each call-in warehouse area are determined from the call-out second robots, then, for each call-in warehouse area, second target robots of each workstation of the call-in warehouse area are determined from the call-in second robots of the call-in warehouse area, and tasks to be assigned of the workstations are matched with the respective second target robot. In this way, the number of second robots in each initial warehouse area is adjusted according to the actual condition of each initial warehouse area, to attain a reasonable distribution of the number of second robots in each initial warehousing area. This guarantees a balanced task assignment of each initial warehouse area, thereby improving the operation efficiency of the warehousing system as a whole, and can solve the technical problem of low work efficiency caused by the unreasonable distribution of second robots in each warehouse area of the warehousing system in the related art.

In an implementation, as shown in FIG. 12, S1101 includes:

S1201: in a case where the number of the current second robots of the initial warehouse area is less than a second robot assignment number of the initial warehouse area, determining the initial warehouse area as the call-in warehouse area; and S1202: in a case where the number of the current second robots of the initial warehouse area is greater than the second robot assignment number of the initial warehouse area, determining the initial warehouse area as the call-out warehouse area;

wherein the second robot assignment number of the initial warehouse area is a product of a ratio of a number of unfinished tasks of the initial warehouse area to a sum of numbers of unfinished tasks of the warehousing system and a total number of second robots of the warehousing system. In other words, the second robot assignment number of the initial warehouse area is a product of a ratio of the number of uncompleted tasks of the initial warehouse area to the total number of uncompleted tasks of the warehousing system and the total number of the second robots of the warehousing system.

It should be noted that, in a case where the number of current second robots in the initial warehouse area is equal to the second robot assignment number of the initial warehouse area, it is unnecessary to call in or out a second robot for the initial warehouse area, i.e., the initial warehouse area is neither a call-in warehouse area nor a call-out warehouse area.

In an implementation, as shown in FIG. 13, S1102 includes:

- S1301: calculating a second robot call-out number of the call-out area according to a number of current second robots, a lower limit of a number of second robots, a second robot assignment number, and a number of idle second robots of the call-out warehouse area; and
- S1302: determining the call-out second robots of the call-out warehouse area according to the second robot call-out number of the call-out warehouse area.

Exemplarily, for each call-out warehouse area, when the second robot assignment number is greater than or equal to the lower limit of the number of second robots of the call-out warehouse area, a difference between the number of current second robots and the second robot assignment number is calculated, and a minimum value in the difference and the number of idle second robots is used as a second robot call-out number of the call-out warehouse area. When the second robot assignment number is smaller than the lower limit of the number of second robots of the call-out warehouse area, a difference between the number of current second robots and a lower limit of a number of the second robots is calculated, and a minimum value in the difference and the number of idle second robots is used as a second robot call-out number of the call-out warehouse area. Herein, the lower limit of the number of the second robots may be a preset minimum value of the number of the second robots receivable in the call-out warehouse area; the number of the idle second robots may be a sum of a number of second robots currently having not been assigned with a task and a number of second robots performing a material box return task and having a distance away from a task destination being greater than a preset distance threshold.

The second robot call-out number $U_3$ of the call-out warehouse area may satisfy the following equation: $U_3=\max(k, \max(0, k_1-\max(k_2, k_{min}))$, where k is a number of idle second robots of the call-out warehouse area, $k_1$ is a number of current second robots of the call-out warehouse area, and $k_{min}$ is a lower limit of a number of second robots of the call-out warehouse area.

Exemplarily, after the second robot call-out number of the call-out warehouse area is obtained, a respective number of idle second robots are selected from the call-out warehouse area as the call-out second robots.

In an implementation, as shown in FIG. 14, S1103 includes:

- S1401, calculating a second robot call-in number of the call-in warehouse area according to a second robot assignment number, a number of current second robots, and an upper limit of a number of second robots of the call-in warehouse area;
- S1402: using a product of a ratio of the second robot call-in number of the call-in warehouse area to a sum of second robot call-in numbers of the respective call-in warehouse areas and a sum of second robot call-out numbers of the respective call-out warehouse areas, as a reference value;
- S1403: determining a minimum value in the reference value and the second robot call-in number of the call-in warehouse area as an actually required number of second robots of the call-in warehouse area; and
- S1404: selecting, from the call-out second robots of each of the call-out warehouse areas, a call-out second robot closest to the call-in warehouse area as a call-in second robot of the call-in warehouse area according to the actually required number of second robots of the call-in warehouse area.

Exemplarily, at S1401, for each call-in warehouse area, when the second robot assignment number is less than or equal to an upper limit of a number of second robots of the call-in warehouse area, a difference between the second robot assignment number and the number of current second robots is calculated, and, if the difference is greater than 0, the difference is used as a second robot call-in number of the call-in warehouse area. When a second robot assignment number is greater than the upper limit of the number of the second robots of the call-in warehouse area, a difference between the upper limit of the number of second robots and the number of current second robots is calculated, and if the difference is greater than 0, the difference is used as a second robot call-in number of the call-in warehouse area. Herein, the upper limit of the number of second robots may be a preset maximum value of the number of second robots receivable in the call-in warehouse area.

The second robot call-in number $U_4$ of a call-in warehouse area may satisfy the following equation: $U_4=\max(0, \min(p_2, p_{max})-p_1)$, where, $p_1$ is a number of current second robots of the call-in warehouse area, $p_2$ is a second robot assignment number of the call-in warehouse area, and pam is an upper limit of a number of second robots of the call-in warehouse area.

Exemplarily, at S1404, the call-out second robot closest to the call-in warehouse area refers to a call-out second robot having a current position closest to the call-in warehouse area and having not been assigned a task, among call-out second robots, and a call-out second robot performing a material box return task and having a task destination position closest to the call-in warehouse area, among call-out second robots. After the call-in second robot of the call-in warehouse area is determined, a movement command is sent to the call-in second robot, to control the call-in second robot to move to the target call-in warehouse area.

In an implementation, as shown in FIG. 15, an initial warehouse area includes a plurality of workstations, and the method further includes:

- S1501: determining, according to types of tasks to be assigned and a number of the tasks to be assigned for the warehouse area to be matched, second target robots corresponding to each of workstations from the idle second robots of the warehouse area to be matched; and
- S1502: matching tasks to be assigned of the workstation with the second target robots corresponding to the workstation.

It should be noted that, the warehouse area to be assigned includes respective call-in warehouse areas and respective call-out warehouse areas after scheduling of second robots is finished, and the warehouse area to be assigned further includes initial warehouse areas without performing the scheduling of second robots.

Exemplarily, the type of tasks to be assigned may include an ex-warehouse task, an in-warehouse task and a check task. Herein, the ex-warehouse task is a task of transporting a material box on a storage shelf to a workstation; the in-warehouse task is a task of transporting a material box of a workstation to a storage shelf, and the check task refers to that a material box transported from a storage shelf to a workstation is checked by a worker, and the checked material box is transported back to the storage shelf. Further, the type of a workstation corresponds to the type of a task to be assigned. In other words, each type of tasks to be assigned corresponds to one or more workstations. For example, an ex-warehouse task corresponds to at least one ex-warehouse workstation, an in-warehouse task corresponds to at least one in-warehouse workstation, and a check task corresponds to at least one check workstation. For various types of tasks to be assigned of a call-in warehouse area, a number of idle second robots required to be assigned according to each type of tasks to be assigned is determined according to a number of tasks to be assigned corresponding to respective types of tasks to be assigned of the call-in warehouse area, then the idle second robots are assigned as second target robots to workstations corresponding to the types of tasks to be assigned according to the respective number, and the tasks to be assigned corresponding to the workstations are assigned to the second target robots of the workstation.

It will be appreciated that, in a case where a warehouse area to be matched is a call-out warehouse area after part of second robots are called out, idle second robots in the warehouse area to be matched may be remaining idle second robots of the call-out warehouse area. In a case where a warehouse area to be matched is a call-in warehouse area after part of second robots are called in, idle second robots of the warehouse area to be matched may be idle second robots before second robots are scheduled, and second robots subsequently called in, of the call-in warehouse area.

In a specific example, for each type of tasks to be assigned of a warehouse area to be matched, a number of idle second robots required to be assigned according to respective types of tasks to be assigned may be obtained by calculating a product of a ratio of a number of tasks to be assigned corresponding to the type of tasks to be assigned to a sum of numbers of tasks to be assigned corresponding to respective types of tasks to be assigned and a number of idle second robots of the warehouse to be matched.

In an implementation, as shown in FIG. 16, S1501 includes:

- S1601: calculating, for each of the types of the tasks to be assigned, a first non-fixed weight of the type of the tasks to be assigned, according to a ratio of the number of the tasks to be assigned to a sum of numbers of the respective types of the tasks to be assigned, a fixed weight of the type of the tasks to be assigned, and an initial non-fixed weight of the type of the tasks to be assigned;
- S1602: assigning one of the idle second robots in the warehouse area to be matched, as a second target robot, to a workstation corresponding to a type of the tasks to be assigned having a highest first non-fixed weight;
- S1603: calculating, for each of the types of the tasks to be assigned, a second non-fixed weight of the type of the tasks to be assigned, according to the ratio of the number of the tasks to be assigned to the sum of numbers of the respective types of tasks to be assigned, the fixed weight of the type of the tasks to be assigned, and the first non-fixed weight of the type of the tasks to be assigned; and
- S1604: in a case where a number of the idle second robots to be assigned and the number of the tasks to be assigned are both greater than 0, repeating the first non-fixed weight calculation step, the second target robot assignment step, and the second non-fixed weight calculation step, and using the second non-fixed weight of the type of the tasks to be assigned as the initial non-fixed weight of the type of the tasks to be assigned.

In a specific example, S1601, S1602, S1603 and S1604 can all be implemented via a smooth weighted round-robin algorithm.

Exemplarily, at S1601, a product of a ratio of a number of tasks to be assigned to a sum of numbers of respective tasks to be assigned can be calculated, and a sum of the product and the initial non-fixed weight of the type of the tasks to be assigned is then calculated, to obtain the first non-fixed weight of the type of tasks to be assigned. Herein, the initial non-fixed weight of the type of tasks to be assigned may be 0.

Exemplarily, at S1602, a type of tasks to be assigned having the highest first non-fixed weight is selected, and 1 is added to the number of second target robots assigned to a workstation corresponding to the type of tasks to be assigned.

Exemplarily, at S1603, a product of a ratio of a number of tasks to be assigned to a sum of numbers of respective tasks to be assigned can be calculated, and then a difference of a first non-fixed weight of the type of tasks to be assigned and the product is calculated, to obtain the second non-fixed weight of the type of tasks to be assigned.

Exemplarily, at S1604, in a case where a number of idle second robots to be assigned is greater than 0, S1601, S1602 and S1603 are repeated, and the second non-fixed weight is used as the initial non-fixed weight at subsequent S1601. In a case where the number of idle second robots to be assigned is 0, i.e., after the numbers of the respective types of tasks to be assigned which are assigned to all idle second robots are determined, S1601, S1602 and S1603 are stopped.

Figure 17:
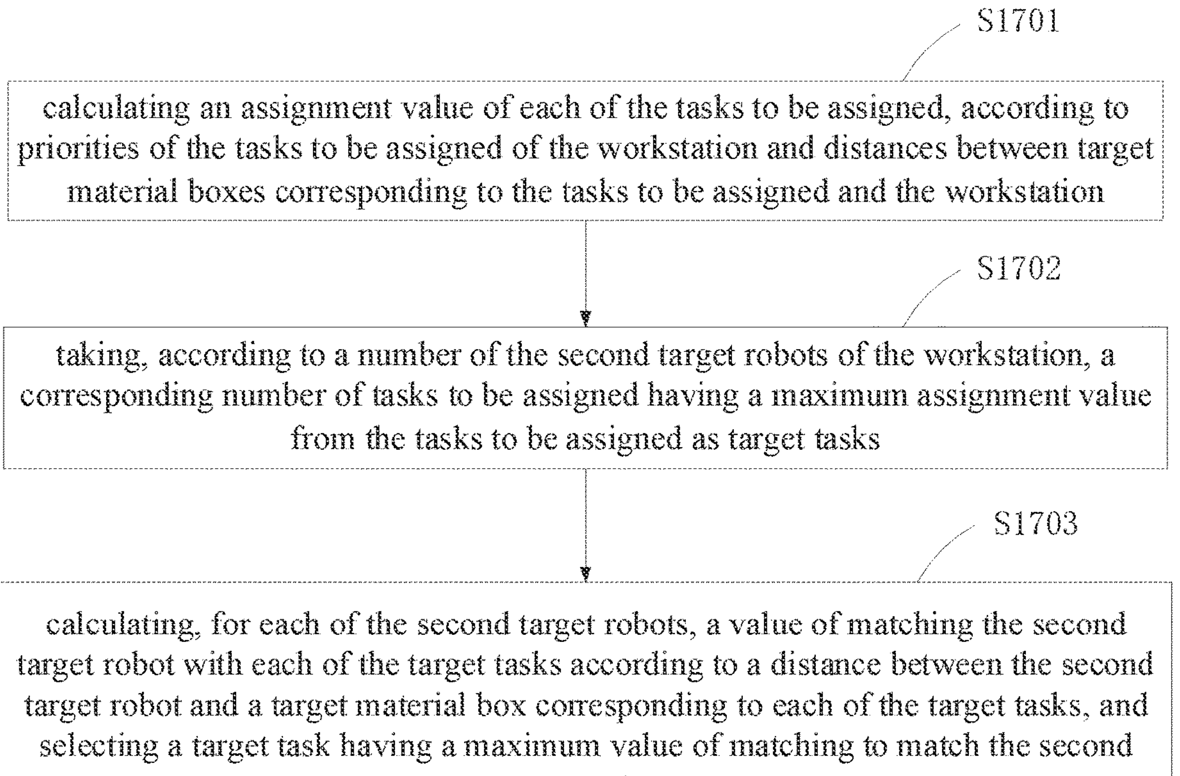
FIG. 17 is a specific flowchart of matching a target task according to the third aspect of the embodiments of the present disclosure.

In an implementation, as shown in FIG. 17, S1502 further includes:

- S1701; calculating an assignment value of each of the tasks to be assigned, according to priorities of the tasks to be assigned of the workstation and distances between target material boxes corresponding to the tasks to be assigned and the workstation;
- S1702: taking, according to a number of the second target robots of the workstation, a corresponding number of tasks to be assigned having a maximum assignment value from the tasks to be assigned as target tasks; and
- S1703; calculating, for each of the second target robots, a value of matching the second target robot with each of the target tasks according to a distance between the second target robot and a target material box corresponding to each of the target tasks, and selecting a target task having a maximum value of matching to match the second target robot.

Exemplarily, at S1701, a ratio of a priority of a material box corresponding to the task to be assigned to a maximum value in priorities of material boxes corresponding to the respective tasks to be assigned of the workstation may be calculated, to obtain a priority ratio value of the task to be assigned. A ratio of the distance between the material box corresponding to the task to be assigned and the workstation to a maximum value in distances between material boxes corresponding to respective tasks to be assigned of the workstation and the workstation, to obtain a distance ratio value of the task to be assigned. Then, a difference between the priority ratio value of the task to be assigned and the distance ratio value of the task to be assigned is calculated, to obtain the assignment value of the task to be assigned.

Exemplarily, at S1703, a maximum weight match between the target task and the second target robot in case of having completed matching may be derived using a KM (Kuhn-Munkres) algorithm.

Specifically, all second target robots are added to a vertex set X, all target tasks are added to a vertex set Y, an edge (i, j) is connected between any vertex $x_i$ in the vertex set X and any vertex $y_j$ in the vertex set Y, and a matching value between the second target robot i and the target task j is used as a weight of the edge (i, j), thereby constructing a weighted bipartite graph of all the second target robots and all the target tasks. Then, a maximum weight match of the weighted bipartite graph in case of having completed matching is derived using the KM algorithm, i.e., a match is derived such that all vertexes in the vertex set X respectively have a corresponding matched vertex from the vertex set Y while all vertexes in the vertex set Y respectively have a corresponding matched vertex from the vertex set X, and the sum of weights of all edges (i, j) in case of the match is largest.

Herein, a matching value between the second target robot i and the target task j may be an opposite number of a distance between a target material box corresponding to the target task j and the workstation.

It is to be understood that the maximum weight match of the vertex set X and the vertex set Y derived using the KM algorithm in case of having completed matching is an optimum matching result between the second target robot and the target task, and a sum of matching values between the corresponding second target robots and the target task in respective group is largest. As such, an optimum matching result between the second target robot and the target task can be derived rapidly and accurately, to guarantee overall that each second target robot has a high matching value with each target task. In the case, the second target robot preferentially performs a target task with a high efficiency, which is beneficial to improve the execution efficiency of the tasks to be assigned of the workstation.

Figure 18:
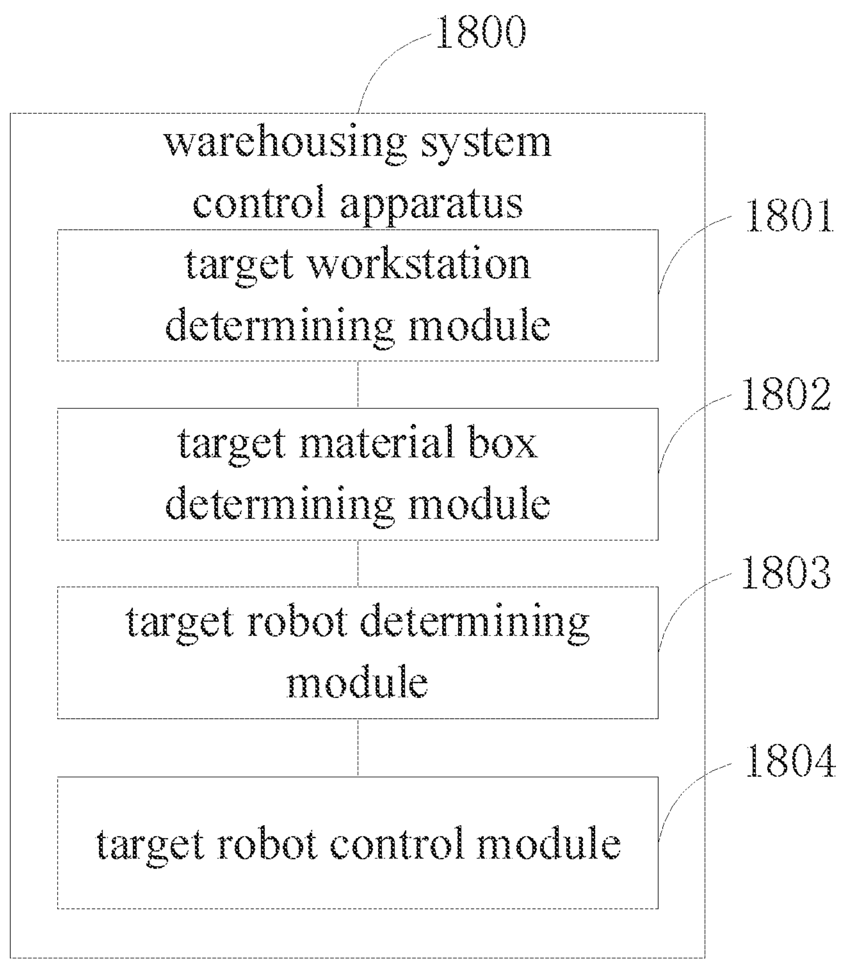
FIG. 18 is a schematic diagram of a warehousing system control apparatus according to the fourth aspect of the embodiments of the present disclosure.

Reference will be made to FIG. 18 below to describe a warehousing system control apparatus 1800 according to the fourth aspect of the embodiments of the present disclosure.

As shown in FIG. 18, the warehousing system control apparatus 1800 includes:

- a target workstation determining module 1801 configured for determining a target workstation according to cargo information of a task to be assigned;
- a target material box determining module 1802 configured for determining candidate material boxes according to cargo information of each of current material boxes and the cargo information of the task to be assigned, and selecting a candidate material box incurring a minimum transportation cost from the respective candidate material boxes as a target material box;
- a target robot determining module 1803 configured for determining a target robot according to position information of the target material box; and
- a target robot control module 1804 configured for controlling the target robot to transport the target material box to the target workstation.

In an implementation, the target workstation determining module 1801 includes:

- a candidate workstation determining sub-module configured for determining candidate workstations according to a number of slots to be occupied of the task to be assigned and a number of idle slots of respective workstations;
- an assignment efficiency value calculating sub-module configured for calculating an assignment efficiency value of each of the candidate workstations according to cargo information of assigned material boxes of the candidate workstations, distances between the respective material boxes and the candidate workstations, cargo information of material boxes not assigned to the candidate workstations, and remaining cargo information of the task to be assigned; and
- a target workstation determining sub-module configured for determining a candidate workstation having a maximum assignment efficiency value as the target workstation.

In an implementation, the target material box determining module 1802 includes:

- a remaining cargo information determining sub-module configured for determining remaining cargo information of the task to be assigned according to the cargo information of the task to be assigned and cargo information of assigned material boxes of the target workstation;
- a candidate material box determining sub-module configured for determining material boxes satisfying the remaining cargo information of the task to be assigned as the candidate material boxes, according to the cargo information of each of the current material boxes; and
- a target material box determining sub-module configured for calculating a transportation cost of each of the candidate material boxes, and determining the candidate material box incurring the minimum transportation cost as the target material box.

In an implementation, robots include first robots, and the target robot determining module 1803 includes:

- a target channel determining sub-module configured for determining a target channel corresponding to the target material box according to the position information of the target material box; and
- determining a first target robot according to a position of each of the first robots in the target channel, wherein the first target robot is configured to transport the target material box from a storage position to a buffer position.

In an implementation, the robots include second robots, and the target robot determining module 1803 further includes:

- a second target robot determining sub-module configured for determining a second robot closest to the target material box as a second target robot according to the position information of the target material box, wherein the second target robot is configured to transport the target material box from the buffer position to the target workstation.

In an implementation, the target robot control module 1804 is further configured to:

- control the second target robot to transport the target material box from the target workstation to a target shelf; and
- control the second target robot to stop under an idle buffer position of a storage shelf.

For functions of respective modules in the warehousing system control apparatus 1800 according to the fourth aspect of the embodiments of the present disclosure, please refer to the corresponding description on the control method according to the above first aspect of the embodiments, which is omitted here for brevity.

Figure 19:
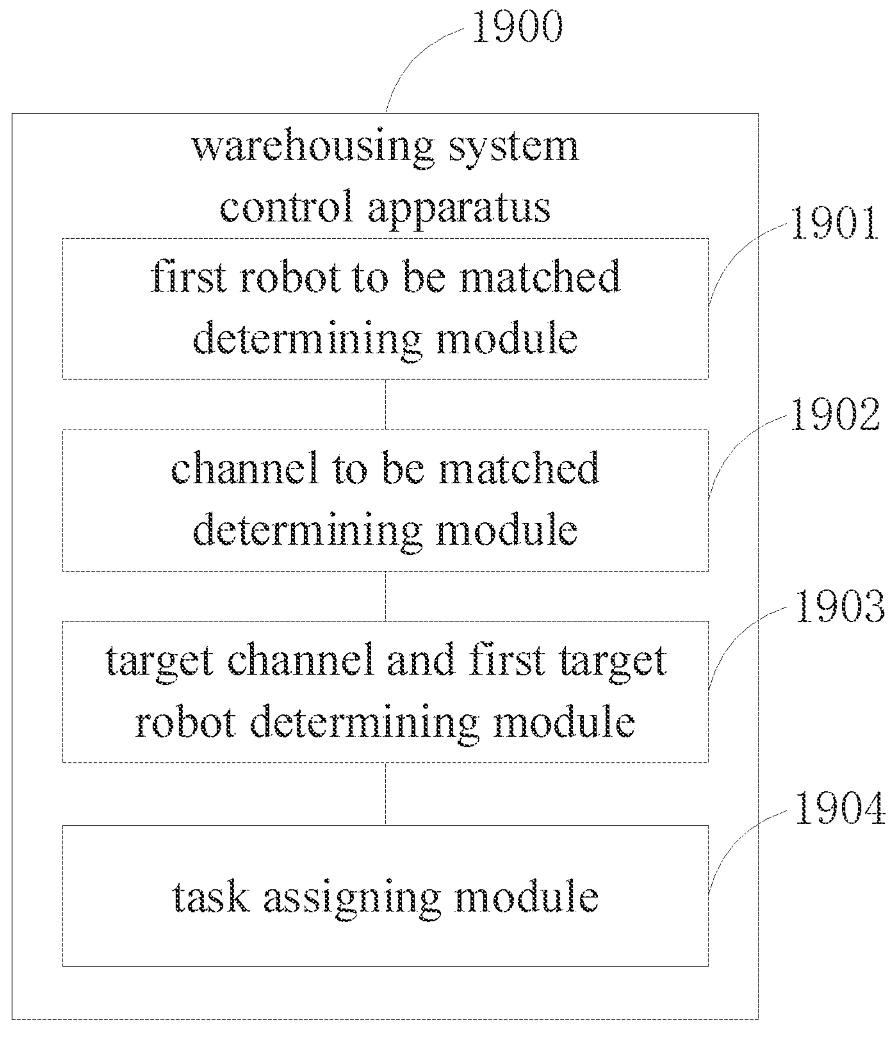
FIG. 19 is a schematic diagram of a warehousing system control apparatus according to the fifth aspect of the embodiments of the present disclosure.

Reference will be made to FIG. 19 below to describe a warehousing system control apparatus 1900 according to the fifth aspect of the embodiments of the present disclosure.

As shown in FIG. 19, the warehousing system control apparatus 1900 includes:

- a first robot to be matched determining module 1901 configured for selecting first robots in an idle state as first robots to be matched;

a channel to be matched determining module 1902 configured for selecting, according to position information of a target material box, channels where the target material box is located as channels to be matched;

a target channel and first target robot determining module 1903 configured for determining, for each of the first robots to be matched, a corresponding target channel and a corresponding first target robot according to a distance between the first robot to be matched and each of the channels to be matched and a number of tasks to be assigned for each of the channels to be matched; and a task assigning module 1904 configured for assigning tasks to be assigned for the target channel to the corresponding first target robot.

In an implementation, the channel to be matched determining module 1902 includes:

a first channel to be matched determining sub-module configured for selecting channels having tasks to be assigned but no first robots as first channels to be matched; and in a case where a number of the first channels to be matched is less than a number of the first robots to be matched, selecting channels having tasks to be assigned and first robots as second channels to be matched.

In an implementation, the task assigning module 1904 includes:

an assignable task number calculation sub-module configured for calculating a number of assignable tasks of the target channel;

a work area division sub-module configured for in a case where the number of the assignable tasks is greater than 0, dividing, according to a number of first target robots, the target channel into a corresponding number of work areas;

a first robot to be assigned determining sub-module configured for selecting first target robots each having a number of assigned tasks less than an upper threshold of tasks as first robots to be assigned; and a target task assigning sub-module configured for determining target tasks from the assignable tasks according to distances between the first robots to be assigned and a target material box corresponding to each of the assignable tasks, and numbers of work areas by which the first robots to be assigned move to the target material box corresponding to each of the assignable tasks, and assigning the target tasks to corresponding ones of the first robots to be assigned.

In an implementation, the assignable task number calculation sub-module includes:

a first reference value calculation unit configured for obtaining a first reference value by adding a minimum value in a number of ex-warehouse tasks to be assigned of the target channel and a number of idle buffer positions to a minimum value in a number of in-warehouse tasks to be assigned of the target channel and a number of idle storage positions;

a second reference value calculation unit configured for obtaining a second reference value by subtracting a total number of assigned tasks of all matched first robots from a product of a number of the matched first robots and the upper threshold of tasks; and an assignable task number determining unit configured for selecting a minimum value in the first reference value and the second reference value as the number of the assignable tasks of the target channel.

For functions of respective modules in the warehousing system control apparatus 1900 according to the fifth aspect of the embodiments of the present disclosure, please refer to the corresponding description on the control method according to the above second aspect of the embodiments, which is omitted here for brevity.

Figure 20:
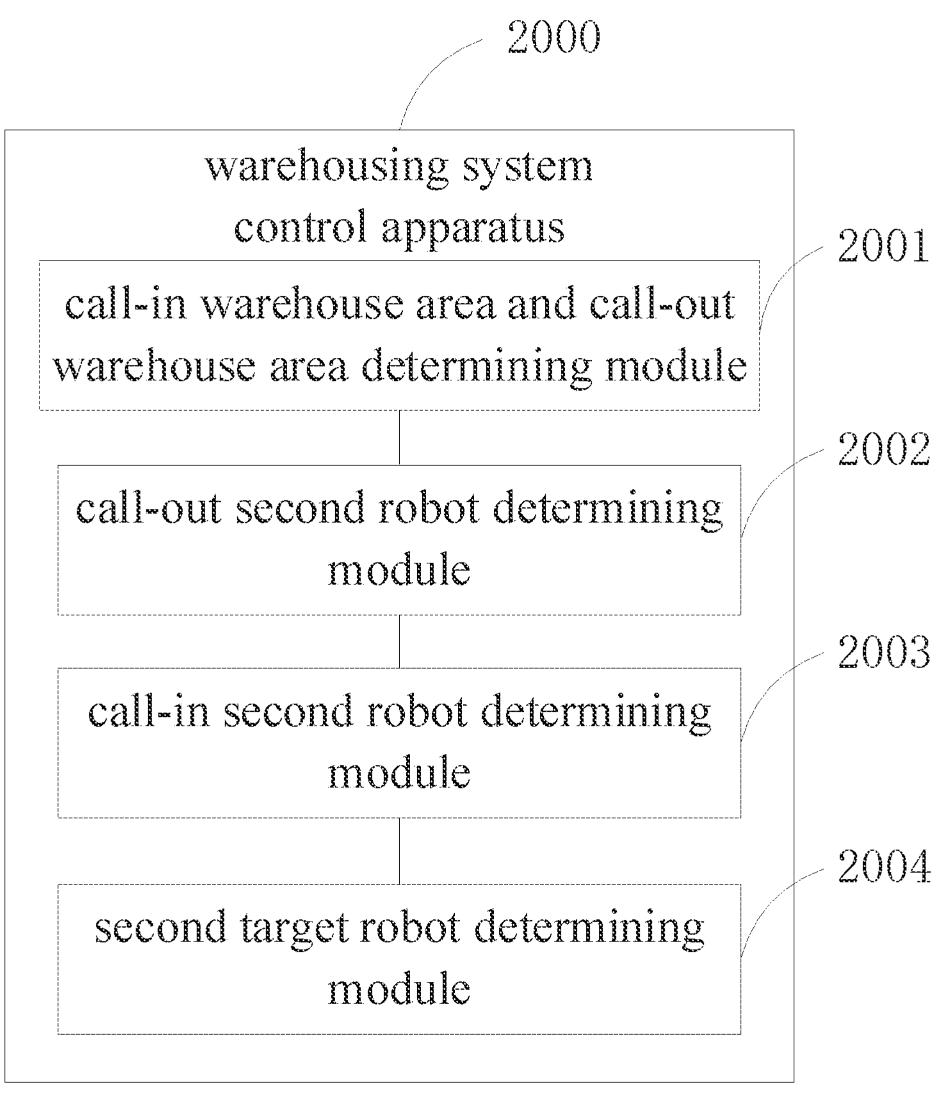
FIG. 20 is a schematic diagram of a warehousing system control apparatus according to the sixth aspect of the embodiments of the present disclosure.

Reference will be made to FIG. 20 below to describe a warehousing system control apparatus 2000 according to the sixth aspect of the embodiments of the present disclosure.

As shown in FIG. 20, the warehousing system control apparatus 2000 includes:

a call-in warehouse area and call-out warehouse area determining module 2001 configured for determining, according to a number of tasks to be assigned and a number of current second robots of each of initial warehouse areas, call-in warehouse areas and call-out warehouse areas from a plurality of initial warehouse areas;

a call-out second robot determining module 2002 configured for determining call-out second robots in each of the call-out warehouse areas;

a call-in second robot determining module 2003 configured for determining call-in second robots in each of the call-in warehouse areas from the respective call-out second robots, and scheduling the call-in second robots from the call-out warehouse area to a corresponding call-in warehouse area; and a second target robot determining module 2004 configured for determining, for each of warehouse areas to be matched, a second target robot corresponding to each of target material boxes in the warehouse area to be matched from idle second robots of the warehouse area to be matched.

In an implementation, the call-in warehouse area and call-out warehouse area determining module 2001 includes:

a call-in warehouse area determining sub-module configured for in a case where the number of the current second robots of the initial warehouse area is less than a second robot assignment number of the initial warehouse area, determining the initial warehouse area as the call-in warehouse area; and a call-out warehouse area determining sub-module configured for in a case where the number of the current second robots of the initial warehouse area is greater than the second robot assignment number of the initial warehouse area, determining the initial warehouse area as the call-out warehouse area;

wherein the second robot assignment number of the initial warehouse area is a product of a ratio of a number of unfinished tasks of the initial warehouse area to a sum of numbers of unfinished tasks of the warehousing system and a total number of second robots of the warehousing system.

In an implementation, the call-out second robot determining module 2002 includes:

a second robot call-out number calculation sub-module configured for calculating a second robot call-out number of the call-out area according to a number of current second robots, a lower limit of a number of second robots, a second robot assignment number, and a number of idle second robots of the call-out warehouse area; and a call-out second robot determining sub-module configured for determining the call-out second robots of the call-out warehouse area according to the second robot call-out number of the call-out warehouse area.

In an implementation, the call-in second robot determining module 2003 includes:

a second robot call-in number calculation sub-module configured for calculating a second robot call-in number of the call-in warehouse area according to a second robot assignment number, a number of current second robots, and an upper limit of a number of second robots of the call-in warehouse area;

a reference value calculation sub-module configured for using a product of a ratio of the second robot call-in number of the call-in warehouse area to a sum of second robot call-in numbers of the respective call-in warehouse areas and a sum of second robot call-out numbers of the respective call-out warehouse areas, as a reference value;

an actually required second robot number determining sub-module configured for determining a minimum value in the reference value and the second robot call-in number of the call-in warehouse area as an actually required number of second robots of the call-in warehouse area, and a call-in second robot determining sub-module for selecting, from the call-out second robots of each of the call-out warehouse areas, a call-out second robot closest to the call-in warehouse area as a call-in second robot of the call-in warehouse area according to the actually required number of second robots of the call-in warehouse area.

In an implementation, the second target robot determining module 2004 includes:

a second target robot determining sub-module configured for determining, according to types of tasks to be assigned and a number of the tasks to be assigned for the warehouse area to be matched, second target robots corresponding to each of workstations from the idle second robots of the warehouse area to be matched; and a task matching sub-module configured for matching tasks to be assigned of the workstation with the second target robots corresponding to the workstation.

In an implementation, the second target robot determining sub-module includes:

a first non-fixed weight calculation unit configured for calculating, for each of the types of the tasks to be assigned, a first non-fixed weight of the type of the tasks to be assigned, according to a ratio of the number of the tasks to be assigned to a sum of numbers of the respective types of the tasks to be assigned, a fixed weight of the type of the tasks to be assigned, and an initial non-fixed weight of the type of the tasks to be assigned;

a second target robot assignment unit configured for assigning one of the idle second robots in the warehouse area to be matched, as a second target robot, to a workstation corresponding to a type of the tasks to be assigned having a highest first non-fixed weight;

a second non-fixed weight calculation unit configured for calculating, for each of the types of the tasks to be assigned, a second non-fixed weight of the type of the tasks to be assigned, according to the ratio of the number of the tasks to be assigned to the sum of numbers of the respective types of tasks to be assigned, the fixed weight of the type of the tasks to be assigned, and the first non-fixed weight of the type of the tasks to be assigned; and a repeating unit configured for, in a case where a number of the idle second robots to be assigned and the number of the tasks to be assigned are both greater than 0, repeating the first non-fixed weight calculation step, the second target robot assignment step, and the second non-fixed weight calculation step, and using the second non-fixed weight of the type of the tasks to be assigned as the initial non-fixed weight of the type of the tasks to be assigned.

In an implementation, the task matching sub-module includes:

an assignment value calculation unit configured for calculating an assignment value of each of the tasks to be assigned, according to priorities of the tasks to be assigned of the workstation and distances between target material boxes corresponding to the tasks to be assigned and the workstation;

a target task determining unit configured for taking, according to a number of the second target robots of the workstation, a corresponding number of tasks to be assigned having a maximum assignment value from the tasks to be assigned as target tasks; and a target task matching unit configured for calculating, for each of the second target robots, a value of matching the second target robot with each of the target tasks according to a distance between the second target robot and a target material box corresponding to each of the target tasks, and selecting a target task having a maximum value of matching to match the second target robot.

For functions of respective modules in the warehousing system control apparatus 2000 according to the sixth aspect of the embodiments of the present disclosure, please refer to the corresponding description on the control method according to the above third aspect of the embodiments, which is omitted here for brevity.

Figure 21:
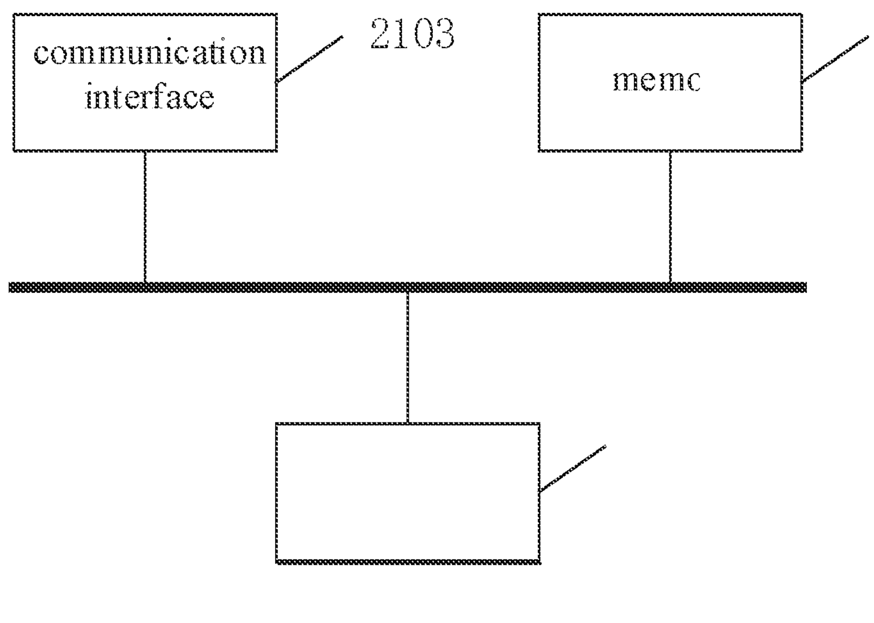
FIG. 21 is a schematic diagram of an electronic device according to the seventh aspect of the embodiments of the present application.

FIG. 21 is a structural block diagram of an electronic device according to an embodiment of the present disclosure. As shown in FIG. 21, the electronic device includes: a memory 2101 and a processor 2102, wherein the memory 2101 stores instructions which may be operated on the processor 2102 therein. The processor 2102, when executing the instructions, implements the control method of a warehousing system according to any one of the above embodiments. The memory 2101 and the processor 2102 may be provided in one or more, respectively. The electronic device aims to cover various forms of digital computers, such as laptops, desktops, workstations, personal digital assistants, servers, blade servers, large-scale computers, and other suitable computers. The electronic device may further cover various forms of mobile devices, such as personal digital processors, cellular phones, smart phones, wearable devices and other similar computing devices. The components as well as connections, relations and functions thereon as shown herein are provided merely as an example, without suggesting any limitation to the implementations of the present disclosure described and/or required herein.

The electronic device may further include a communication interface 2103 configured for communicating with an external device and performing data interactive transmission. Respective devices are mutually connected via different buses, and may be mounted on a common mainboard or in other manner as required. The processor 2102 can process instructions executed in the electronic device, including instructions stored in or on the memory to display graphical information of GUI on an external input/output device (e.g., a display device coupled to an interface). In other implementations, if required, a plurality of processors and/or a plurality of buses are used together with a plurality of memories. Likewise, a plurality of electronic devices may be connected, each of which provides some of necessary operations (e.g., as a server array, a set of blade servers, or a multi-processor system). The bus may be divided into an address bus, a data bus, a control bus, and the like. For ease of description, a thick line is employed in FIG. 21, which does not necessarily indicate that there is only one bus or one type of bus.

Optionally, in specific implementations, if the memory 2101, the processor 2102 and the communication interface 2103 are integrated on a chip, the memory 2101, the processor 2102 and the communication interface 2103 can communicate with one another via internal interfaces.

It is to be understood that the above processor may be a Central Processing Unit (CPU), or may be other general processor, a Digital Signal Processing (DSP), an Application Specific Integrated Circuit (ASIC), a Field Programmable Gate Array (FPGA) or other programmable logic device, a discrete gate or transistor logic device, a discrete hardware component and the like. The general processor may be a microprocessor, or any common processor. It should be noted that the processor may be a processor supporting Advance RISC Machine (ARM) architecture.

The embodiments of the present disclosure provide a computer-readable storage medium (the memory 2101 as stated above) that stores computer instructions, wherein the instructions, when executed by the processor, implements the method according to any one of the embodiments of the present disclosure.

Optionally, the memory 2101 may include a program storage area and a data storage area, wherein the program storage area can store an operating system and an application program required by at least one function, and the data storage area can store data created to be used by the electronic device according to the cargo ex-warehouse, and the like. In addition, the memory 2101 may include a high-speed random access memory, or may include a non-transitory memory, such as at least one disk storage device, flash device, or other non-transient solid state storage memory. In some embodiments, the memory 2101 optionally includes memories disposed remotely relative to the processor 2102, and those remote memories may be connected to electronic devices for cargo ex-warehouse via a network. The instances of the above network include, but are not limited to, an internet, an intranet, a local area network, a mobile communication network and a combination thereof.

As described herein, the description with reference to the terms "an embodiment," "some embodiments," "an example," a detailed example," "some examples" or the like means that specific features, structures, materials or characteristics described with reference to the embodiment or example are covered in at least one or more embodiments or examples of the present disclosure. Moreover, the specific features, structures, materials or characteristics described may be combined in an appropriate manner in any one or more embodiments or examples. In addition, without contradictions, a person skilled in the art may merge and combine different embodiments or examples, as well as features of different embodiments or examples as described herein.

In addition, terms "first" and "second" are used for the purpose of description only, and should not be construed as indicating or implying relative importance or implicitly indicating the number of technical features indicated. Thus, the features defined by "first" or "second" may explicitly or implicitly include at least one feature. In the description of the present disclosure, "a plurality of" means two or more, unless specifically defined otherwise.

Any processor method described in the flowcharts or in other manners may be understood as including one or more (two or more) modules, segments or portions of codes of executable instructions for implementing specific logic functions or steps of processes. The scope of preferred implementations of the present disclosure covers other implementations, wherein the functions may not be performed in the order shown or discussed, including substantially concurrently or in the reverse order depending upon the functions involved.

The logic and/or steps represented in flowcharts or otherwise described herein, for example, may be considered a given list of executable instructions for implementing the logical functions, and may be embodied in any computer-readable medium, for use by, or use in combination with, an instruction execution system, apparatus or device (such as a computer-based system, a system including a processor, or other system that can retrieve instructions from an instruction execution system, apparatus or device and execute the same).

It will be appreciated that various parts of the present disclosure may be implemented in hardware, software, firmware, or a combination thereof. In the embodiments described above, various steps or methods may be implemented in software or firmware stored in memory and executed by a suitable instruction execution system. All or part of the steps of the method in the above-mentioned embodiments can be completed by instructing the related hardware via a program, and the program can be stored in a computer-readable storage medium, when the program is executed, one or a combination of steps of the method according to the embodiments is involved.

In addition, each functional unit in each embodiment of the present disclosure may be integrated into one processing module, or each unit may be present physically alone, or two or more units may be integrated into one module. The above-mentioned integrated modules can be implemented in the form of hardware, or can also be implemented in the form of software functional modules. If the above-mentioned integrated modules are implemented in the form of software functional modules and sold or used as independent products, they may also be stored in a computer-readable storage medium. The storage medium may be a read-only memory, a magnetic disk or an optical disk, and the like.

What are described above are only specific implementations of the present disclosure, but the protection scope of the present disclosure is not limited to this. A person skilled in the art may easily think of variations or substitutions within the scope of the technology disclosed in the present disclosure, which shall be covered in the protection scope of the present disclosure. Therefore, the protection scope of the present disclosure should be subject to the protection scope of the claims.

What is claimed is:

1. A control method of a warehousing system, comprising:

determining a target workstation according to cargo information of a task to be assigned;

determining candidate material boxes according to cargo information of each of current material boxes and the cargo information of the task to be assigned, and selecting a candidate material box incurring a minimum transportation cost from the respective candidate material boxes as a target material box;

determining at least one of a plurality of target robots according to position information of the target material box; and controlling the target robot to transport the target material box to the target workstation;

wherein the determining the target workstation according to the cargo information of the task to be assigned, comprises:

determining a number of slots to be occupied according to the cargo information of the task to be assigned; selecting, from a plurality of workstations, workstations with a number of idle slots being equal to or greater than the number of slots to be occupied as candidate workstations;

calculating a first cargo number corresponding to each of the candidate workstations, wherein the first cargo number is a number of cargoes, in assigned material boxes of the candidate workstation, whose cargo information matches with the cargo information of the task to be assigned, wherein the assigned material boxes of the candidate workstation are all material boxes having been assigned to the candidate workstation before performing the task to be assigned;

calculating an average efficiency value of each of the candidate workstations according to a second cargo number corresponding to each of the candidate workstations and distances between the respective candidate material boxes and the candidate workstations, wherein the second cargo number is a number of cargoes, in material boxes not assigned to the candidate workstation, whose cargo information matches with remaining cargo information of the task to be assigned, wherein the remaining cargo information of the task to be assigned is the remaining cargo information of the task to be assigned that has not been satisfied by the assigned material boxes;

calculating an assignment efficiency value of each of the candidate workstations according to the average efficiency value and the first cargo number of each of the candidate workstations, determining a candidate workstation having a maximum assignment efficiency value as the target workstation.

2. The method of claim 1, wherein the selecting the candidate material box incurring the minimum transportation cost from the respective candidate material boxes as the target material box, comprises:

determining the remaining cargo information of the task to be assigned according to the cargo information of the task to be assigned and cargo information of assigned material boxes of the target workstation, wherein the assigned material boxes of the target workstation are all material boxes having been assigned to the target workstation before performing the task to be assigned;

determining material boxes satisfying the remaining cargo information of the task to be assigned as the candidate material boxes, according to the cargo information of each of the current material boxes; and calculating a transportation cost of each of the candidate material boxes, and determining the candidate material box incurring the minimum transportation cost as the target material box.

3. The method of claim 1, wherein the warehousing system comprise first robots, and the determining at least one of the plurality of target robots according to the position information of the target material box, comprises:

determining a target channel corresponding to the target material box according to the position information of the target material box; and determining a first target robot according to a position of each of the first robots in the target channel, wherein the first target robot is configured to transport the target material box from a storage position of a storage shelf to a buffer position.

4. The method of claim 1, wherein the warehousing system comprise second robots, and the determining at least one of the plurality of target robots according to the position information of the target material box, further comprises:

determining a second robot closest to the target material box as a second target robot according to the position information of the target material box, wherein the second target robot is configured to transport the target material box from a buffer position of a storage shelf to the target workstation.

5. The method of claim 4, wherein, after controlling the target robot to transport the target material box to the target workstation, the method further comprises:

controlling the second target robot to transport the target material box from the target workstation to a target shelf, and controlling the second target robot to stop under an idle buffer position of a storage shelf.

6. The method of claim 1, wherein the selecting the candidate material box incurring the minimum transportation cost from the respective candidate material boxes as the target material box, comprises:

determining remaining cargo information of the task to be assigned according to the cargo information of the task to be assigned and cargo information of assigned material boxes of the target workstation;

determining material boxes satisfying the remaining cargo information of the task to be assigned as the candidate material boxes, according to the cargo information of each of the current material boxes; and calculating a transportation cost of each of the candidate material boxes, and determining the candidate material box incurring the minimum transportation cost as the target material box.

7. The method of claim 1, wherein robots comprise first robots, and the determining the target robot according to the position information of the target material box, comprises:

determining a target channel corresponding to the target material box according to the position information of the target material box; and determining a first target robot according to a position of each of the first robots in the target channel, wherein the first target robot is configured to transport the target material box from a storage position to a buffer position.

8. The method of claim 1, wherein robots comprise second robots, and the determining the target robot according to the position information of the target material box, further comprises:

determining a second robot closest to the target material box as a second target robot according to the position information of the target material box, wherein the second target robot is configured to transport the target material box from the buffer position to the target workstation.

9. The method of claim 1, further comprising:

selecting first robots in an idle state as first robots to be matched;

selecting, according to position information of a plurality of target material boxes, channels where the plurality of target material boxes are located as channels to be matched;

determining, for each of the first robots to be matched, a corresponding target channel and a corresponding first target robot according to a distance between the first robot to be matched and each of the channels to be matched and a number of tasks to be assigned for each of the channels to be matched; and assigning tasks to be assigned for the target channel to the corresponding first target robot.

10. The method of claim 9, wherein the selecting the channels where the target material box is located as the channels to be matched, comprises:

selecting channels having tasks to be assigned but no first robots physically located as first channels to be matched; and in a case where a number of the first channels to be matched is less than a number of the first robots to be matched, selecting channels having tasks to be assigned and first robots physically located as second channels to be matched.

11. The method of claim 10, wherein the assigning the tasks to be assigned for the target channel to the corresponding first target robot, comprises:

calculating a number of assignable tasks of the target channel;

in a case where the number of the assignable tasks is greater than 0, dividing, according to a number of first target robots, the target channel into a corresponding number of work areas;

selecting first target robots each having a number of assigned tasks less than an upper threshold of tasks as first robots to be assigned; and determining target tasks from the assignable tasks according to distances between the first robots to be assigned and a target material box corresponding to each of the assignable tasks, and numbers of work areas by which the first robots to be assigned move to the target material box corresponding to each of the assignable tasks, and assigning the target tasks to corresponding ones of the first robots to be assigned.

12. The method of claim 11, wherein the calculating the number of the assignable tasks of the target channel, comprises:

obtaining a first reference value by adding a minimum value in a number of ex-warehouse tasks to be assigned of the target channel and a number of idle buffer positions to a minimum value in a number of in-warehouse tasks to be assigned of the target channel and a number of idle storage positions;

obtaining a second reference value by subtracting a total number of assigned tasks of all matched first robots from a product of a number of the matched first robots and the upper threshold of tasks; and selecting a minimum value in the first reference value and the second reference value as the number of the assignable tasks of the target channel.

13. The method of claim 1, further comprising:

determining, according to a number of tasks to be assigned and a number of current second robots of each of a plurality of initial warehouse areas in the warehousing system, call-in warehouse areas and call-out warehouse areas from the plurality of initial warehouse areas, wherein the initial warehouse areas refer to respective warehouse areas before the second robots are scheduled;

determining, from the current second robots of each of the call-out warehouse areas, call-out second robots in each of the call-out warehouse areas;

determining call-in second robots in each of the call-in warehouse areas from the respective call-out second robots, and scheduling the call-in second robots from the call-out warehouse area to a corresponding call-in warehouse area; and determining, for each of warehouse areas to be matched, a second target robot corresponding to each of target material boxes in the warehouse area to be matched from idle second robots of the warehouse area to be matched, wherein the warehouse area to be matched comprises the respective call-in warehouse areas and respective call-out warehouse areas after scheduling of the second robots is finished as well as the initial warehouse areas without performing the scheduling of second robots, wherein the idle second robots comprises second robots currently having not been assigned with a task and second robots performing a material box return task and having a distance away from a task destination being not greater than a preset distance threshold.

14. The method of claim 13, wherein the determining, according to the number of tasks to be assigned and the number of the current second robots of each of the initial warehouse areas, the call-in warehouse areas and the call-out warehouse areas from the plurality of initial warehouse areas, comprises:

in a case where the number of the current second robots of the initial warehouse area is less than a second robot assignment number of the initial warehouse area, determining the initial warehouse area as the call-in warehouse area; and in a case where the number of the current second robots of the initial warehouse area is greater than the second robot assignment number of the initial warehouse area, determining the initial warehouse area as the call-out warehouse area;

wherein the second robot assignment number of the initial warehouse area is a product of a ratio of a number of unfinished tasks of the initial warehouse area to a sum of numbers of unfinished tasks of the warehousing system and a total number of second robots of the warehousing system.

15. The method of claim 14, wherein the determining the call-out second robots in each of the call-out warehouse areas, comprises:

calculating a second robot call-out number of the call-out area according to a number of current second robots, a lower limit of a number of second robots, a second robot assignment number, and a number of idle second robots of the call-out warehouse area; and determining the call-out second robots of the call-out warehouse area according to the second robot call-out number of the call-out warehouse area.

16. The method of claim 15, wherein the determining the call-in second robots in each of the call-in warehouse areas from the respective call-out second robots, comprises:

calculating a second robot call-in number of the call-in warehouse area according to a second robot assignment number, a number of current second robots, and an upper limit of a number of second robots of the call-in warehouse area;

using a product of a ratio of the second robot call-in number of the call-in warehouse area to a sum of second robot call-in numbers of the respective call-in warehouse areas and a sum of second robot call-out numbers of the respective call-out warehouse areas, as a reference value;

determining a minimum value in the reference value and the second robot call-in number of the call-in warehouse area as an actually required number of second robots of the call-in warehouse area; and selecting, from the call-out second robots of each of the call-out warehouse areas, a call-out second robot closest to the call-in warehouse area as a call-in second robot of the call-in warehouse area according to the actually required number of second robots of the call-in warehouse area.

17. The method of claim 13, wherein the determining the second target robot corresponding to each of the target material boxes in the warehouse area to be matched from the idle second robots of the warehouse area to be matched, comprises:

determining, according to types of tasks to be assigned and a number of the tasks to be assigned for the warehouse area to be matched, second target robots corresponding to each of workstations from the idle second robots of the warehouse area to be matched; and matching tasks to be assigned of the workstation with the second target robots corresponding to the workstation.

18. The method of claim 17, wherein the determining, according to the types of the tasks to be assigned and the number of the tasks to be assigned for the warehouse area to be matched, the second target robots corresponding to each of the workstations from the idle second robots of the warehouse area to be matched, comprises:

calculating, for each of the types of the tasks to be assigned, a first non-fixed weight of the type of the tasks to be assigned, according to a ratio of the number of the tasks to be assigned to a sum of numbers of the respective types of the tasks to be assigned, a fixed weight of the type of the tasks to be assigned, and an initial non-fixed weight of the type of the tasks to be assigned;

assigning one of the idle second robots in the warehouse area to be matched, as a second target robot, to a workstation corresponding to a type of the tasks to be assigned having a highest first non-fixed weight;

calculating, for each of the types of the tasks to be assigned, a second non-fixed weight of the type of the tasks to be assigned, according to the ratio of the number of the tasks to be assigned to the sum of numbers of the respective types of tasks to be assigned, the fixed weight of the type of the tasks to be assigned, and the first non-fixed weight of the type of the tasks to be assigned; and in a case where a number of the idle second robots to be assigned and the number of the tasks to be assigned are both greater than 0, repeating the first non-fixed weight calculation step, the second target robot assignment step, and the second non-fixed weight calculation step, and using the second non-fixed weight of the type of the tasks to be assigned as the initial non-fixed weight of the type of the tasks to be assigned.

19. The method of claim 17, wherein the matching the tasks to be assigned of the workstation with the second target robots corresponding to the workstation, comprises:

calculating an assignment value of each of the tasks to be assigned, according to priorities of the tasks to be assigned of the workstation and distances between target material boxes corresponding to the tasks to be assigned and the workstation;

taking, according to a number of the second target robots of the workstation, a corresponding number of tasks to be assigned having a maximum assignment value from the tasks to be assigned as target tasks; and calculating, for each of the second target robots, a value of matching the second target robot with each of the target tasks according to a distance between the second target robot and a target material box corresponding to each of the target tasks, and selecting a target task having a maximum value of matching to match the second target robot.

* * * * *